(12) United States Patent
Klecka et al.

(10) Patent No.: US 8,103,861 B2
(45) Date of Patent: Jan. 24, 2012

(54) METHOD AND SYSTEM FOR PRESENTING AN INTERRUPT REQUEST TO PROCESSORS EXECUTING IN LOCK STEP

(75) Inventors: James S. Klecka, Georgetown, TX (US); William F. Bruckert, Los Gatos, CA (US); Mihai Damian, Campbell, CA (US); Peter A. Reynolds, Mountain View, CA (US); Dale E. Southgate, Nevada City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1159 days.

(21) Appl. No.: 11/346,736

(22) Filed: Feb. 3, 2006

(65) Prior Publication Data

US 2006/0248321 A1    Nov. 2, 2006

Related U.S. Application Data

(60) Provisional application No. 60/675,810, filed on Apr. 28, 2005.

(51) Int. Cl.
*G06F 9/00* (2006.01)

(52) U.S. Cl. ........................................ 712/244

(58) Field of Classification Search .................. 714/12, 714/34, 244, 11; 712/244
See application file for complete search history.

(56) References Cited

U.S. PATENT DOCUMENTS

| | | | |
|---|---|---|---|
| 4,965,717 A * | 10/1990 | Cutts et al. ...................... 714/12 |
| 5,239,641 A * | 8/1993 | Horst ............................ 713/375 |
| 5,890,003 A | 3/1999 | Cutts, Jr. et al. |
| 6,233,702 B1 | 5/2001 | Horst et al. |
| 2002/0152420 A1 | 10/2002 | Chaudhry et al. |
| 2004/0006722 A1 | 1/2004 | Safford |
| 2004/0153857 A1 | 8/2004 | Yamazaki et al. |
| 2005/0223274 A1* | 10/2005 | Bernick et al. .................. 714/11 |

OTHER PUBLICATIONS

Yoneda et al., "Implementation of Interrupt Handler for Loosely-Synchronized TMR Systems," IEEE, 1985, pp. 246-251.*

* cited by examiner

*Primary Examiner* — David Huisman

(57) ABSTRACT

A method and system of presenting an interrupt request to processors executing in lock step. At least some of the illustrative embodiments are computer systems comprising a first processor configured to execute a program, a second processor configured to execute a duplicate copy of the program in lock step with the first processor, and a logic device coupled to the processors. The logic device is configured to present an interrupt request to the processors when the processors are at substantially the same computational point in the program.

6 Claims, 12 Drawing Sheets

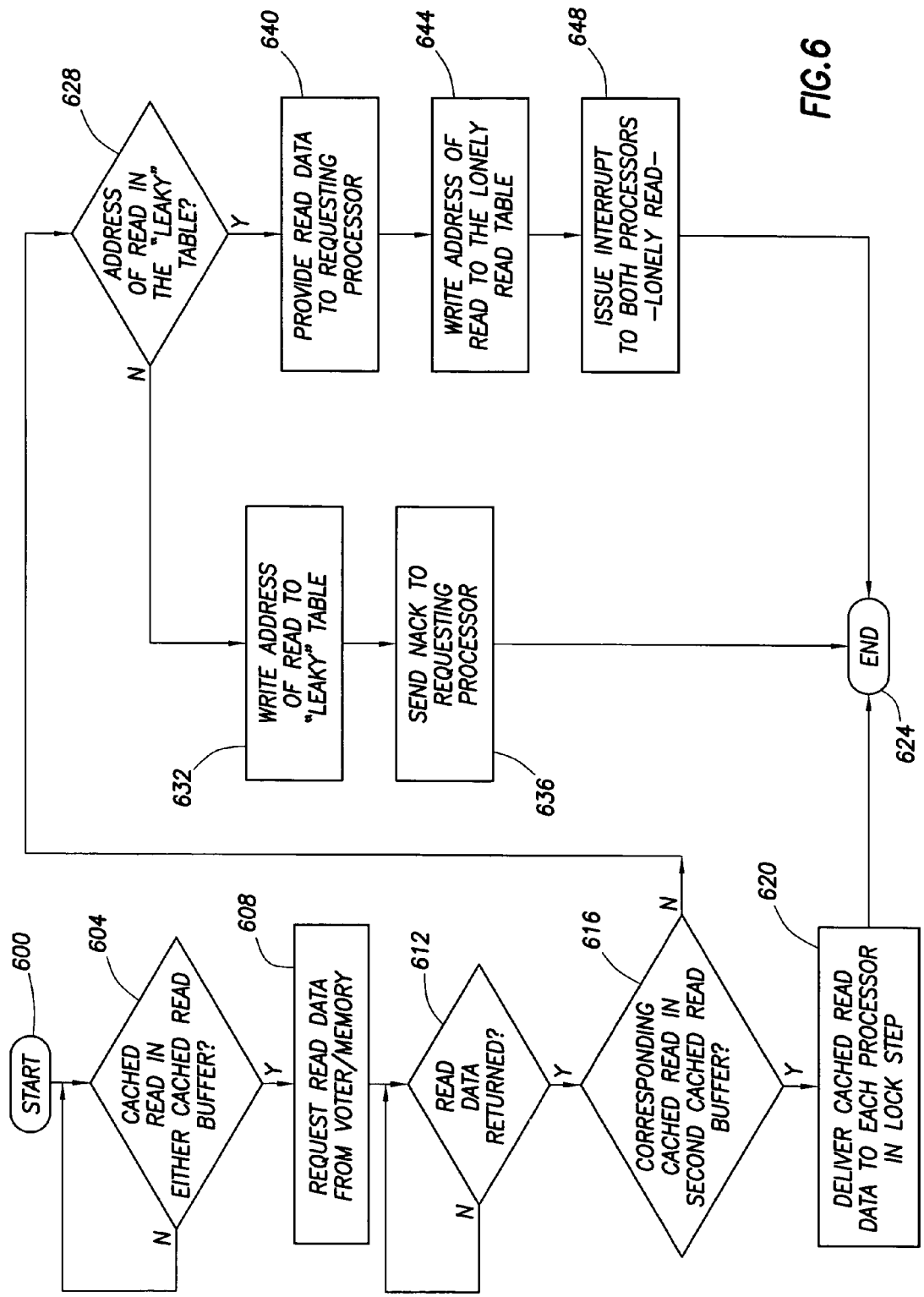

US 8,103,861 B2

METHOD AND SYSTEM FOR PRESENTING AN INTERRUPT REQUEST TO PROCESSORS EXECUTING IN LOCK STEP

CROSS-REFERENCE TO RELATED APPLICATIONS

This application claims the benefit of provisional application 60/675,810 filed Apr. 28, 2005, which application is incorporated by reference herein as if reproduced in full below. This application is also related to: copending application Ser. No. 11/347,642 titled "Method and System of Executing Duplicate Copies of a Program in Lock Step"; copending application Ser. No. 11/346,737 titled "Method and System of Determining the Execution Point of Programs Executed in Lock Step"; and copending application Ser. No. 11/350,315 titled "Method and System of Bringing Processors to the same Execution Point."

BACKGROUND

In order to implement fault detection, some computer systems have two processors operated in strict cycle-by-cycle lock step. That is, each processor is provided duplicate copies of an instruction stream and substantially the same clock signal, and each processor performs identical operations within each cycle. When operating without error, each processor produces identical reads and/or writes in a clock cycle where those reads and/or writes are present. A hardware arbiter compares the reads and/or writes, and if identical the requests are allowed to advance to downstream hardware, such as a single shared main memory or an input/output (I/O) adapter. Faults, whether computational or transient, are detected as: timing differences (e.g., one processors presents a request earlier in time that a second processor); mismatched requests (e.g., one processor presents a read and the second processor presents a write); out of order request presentation (e.g., one processor presents a read followed by a write, and the second processor presents the same write, but first followed by the read); or by differences in read and/or write addresses and/or data. If a fault is detected, the requests are not forwarded to the downstream hardware.

Operating processors in strict cycle-by-cycle lock step assumes that each processor acts in exactly the same fashion when presented the same instruction stream and given the same clock signal. Stated otherwise, operating in strict cycle-by-cycle lock step assumes the processors behave deterministically. However, manufacturers now produce processors that, even if given the same instruction stream and the same clock signal, behave differently even when calculating the same results, and thus these processors are said to behave non-deterministically.

BRIEF DESCRIPTION OF THE DRAWINGS

For a detailed description of exemplary embodiments of the invention, reference will now be made to the accompanying drawings in which:

FIG. 6 illustrates a method of handling cached reads in accordance with embodiments of the invention;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to imply that the scope of the disclosure is limited to that embodiment.

Figure 1:
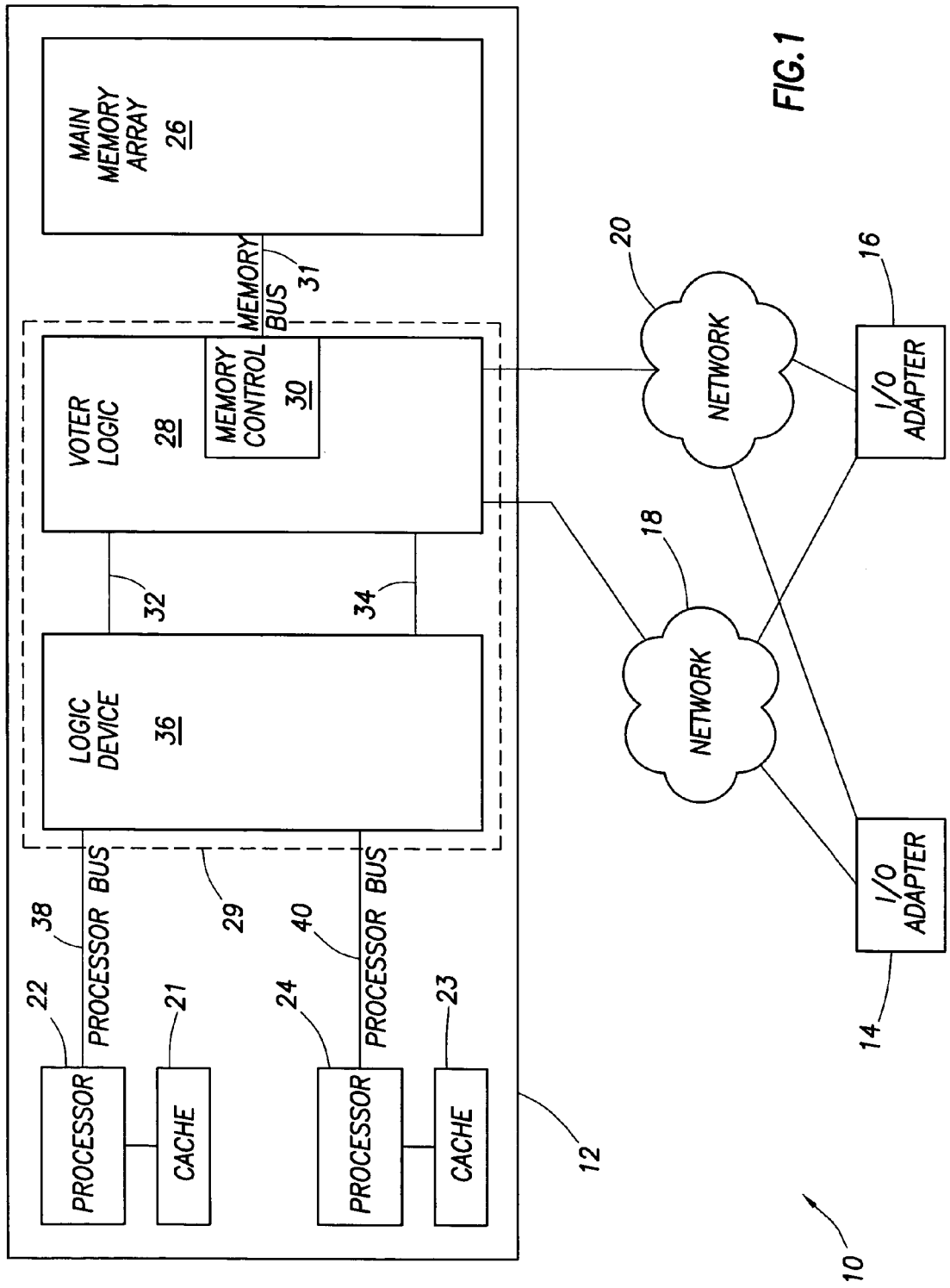
FIG. 1 illustrates a computer system in accordance with embodiments of the invention.

FIG. 1 illustrates a computer system 10 in accordance with embodiments of the invention. In particular, computer system 10 comprises a computer board or slice 12 coupled to illustrative input/output (I/O) adapters 14 and 16 by way of redundant communication networks 18 and 20. Although only one computer slice 12 is shown, many computer slices that are not specifically shown may couple to the communication networks 18 and 20 to form a computer complex. The communication networks facilitate not only communications to and from the I/O adapters 14 and 16, but also facilitate slice-to-slice communication between the computer slices.

Illustrative computer slice 12 further comprises two processors 22 and 24, which processors are preferably operated in lock step and thus act as a single processor (assuming no computational faults or errors). In some embodiments, the processors 22 and 24 operate non-deterministically, and so the processors may operate in other than strict cycle-by-cycle lock step (operating in lock step but not in cycle-by-cycle lock step may be known as loose-lock step, and is discussed more thoroughly below). The processors couple to the main memory 26 and I/O adapters 14 and 16 by way of a voter logic 28.

Voter logic 28 performs a variety of tasks in the illustrative computer system 10. For example, voter logic 28 comprises a memory controller 30, which controls transactions to the main memory array 26. Further, voter logic 28 is the mechanism by which the computer slice 12 couples to external devices, such as networks 18 and 20, other computer slices (not specifically shown), and I/O adapters 14 and 16. Voter logic 28 further consolidates duplicate requests from the processors 22 and 24 before passing a single request to a target device, and duplicates return data (if any) to pass back to the processors 22 and 24. For example, voter logic 28 receives and compares memory write requests from each of the processors 22 and 24. If the write requests match, voter logic 28 sends a single write request and corresponding data to the main memory array 26. Likewise for read requests, voter logic 28 receives and compares read requests, and if the requests match, the voter logic 28 passes a single read request to the main memory array 26. When the read data is returned by the main memory array 26, the voter logic replicates the read data and sends duplicate copies to each processor 22 and 24. It is noted that matching reads is a mechanism to ensure the processors do not become too divergent in their computational point (C-point) and thus may be done for performance reasons, as read in-and-of itself does not have the ability to corrupt shared data.

Voter logic 28 in accordance with at least some embodiments implements strict cycle-by-cycle lock step of the processors 22 and 24. Thus, if timing differences (e.g., one processors presents a read earlier in time that a second processor) arise on the buses 32 and 34, voter logic 28 considers this a fault condition. Likewise, if mismatched requests are presented (e.g., one processor presents a read and the second processor presents a write) on the buses 32 and 34, voter logic 28 considers this a fault condition. Further still, if requests presented do not match exactly (a bit for bit comparison of both target address and data (if any)), the voter logic 28 considers this a fault condition. Thus, voter logic 28 expects to be coupled to and operate in conjunction with fully deterministic processors operated in strict cycle-by-cycle lock step.

In spite of the expectations of voter logic 28 regarding strict cycle-by-cycle lock step, embodiments of the invention use processors 22 and 24 that operate non-deterministically. The processors utilized may thus have features such as out of order processing, speculative cache line fetching, and on-board and external two-way set associative cache memories 21 and 23. Out of order processing and speculative execution may lead to mismatched reads and writes as between two otherwise identical processors even when no fault is present. Likewise, differences in management of their respective caches by the processors may result in mismatch reads and writes, yet no fault may be present. Before turning to specifics of operation of a computer slice 12 in accordance with embodiments of the invention, some of the various ways in which the non-determinism manifests itself are discussed.

Most processors perform program execution in a pipelined manner, with the pre-work to actually executing each instruction occurring in several stages. As the processor fetches and decodes a conditional branch instruction, it may speculate an outcome of the branch in order to keep the pipeline full, even though the true branch outcome is not known until actual execution. Based on the speculation, the processor may speculatively read a cache line from memory. Two processors executing identical code, however, may speculate differently, and thus their respective speculative cached reads may be to different locations. Moreover, while one speculation may require a speculative read, another speculation may not, resulting in a read request from a single processor. A single read request, regardless of the cause, is termed herein a "lonely read." Thus, even though no computational or transient fault is present in either processor, different and/or lonely reads may be presented.

Further, a cached read (whether actual or speculative), will be placed in the processors cache when the cached read data is returned. Unless the cache is clean, placing cached read data in the cache requires victimizing (sending back to main memory) the cache line present at the location where the processor intends to put the newly read data. However, a cache line of data may map to two or more locations in a cache. Thus, two otherwise identical processors may each validly choose to put cached read data at different locations. This in turn may result in differing cached write-backs of the newly victimized cache line. If the cache line present at the location where the first processor intends to put the cached read data is clean, there may be no need to write the location to main memory, and instead the new cache lines merely overwrites the existing cache line. Yet, the second processor may choose a location containing a cache line that needs to be victimized, resulting in an unmatched cached write request from a single processor. A single write, regardless of cause, is termed herein a "lonely write." Thus, even though no computational or transient fault is present in either processor, different and/or lonely writes may be presented.

Further still, for a variety of reasons two processors may experience "cycle slip," where one processor has slips by one or more cycles with respect to the other processor. For example, each processor's cache bus arbiter may be in a different state, and thus a first processor may be provided a cache line faster than a second processor. Regardless of the cycle slip, the two processors may calculate precisely the same results and present the same requests to external devices, but the results and requests of one of the processors may be one or more clock cycles behind. Thus, even though no computational or transient fault is present in either processor, out of synchronism reads and writes may be presented. Cycle slip also adversely affects presentation of interrupts to the processors. Each processor could calculate different results if an interrupt is asserted to and serviced at different points in the instruction stream as between the two processors. Hereinafter, a processor's current execution point in an instruction stream is referred to as the computational point or C-point.

In order to allow use of non-deterministic processors, computer slice 12 further comprises a logic device 36 coupled between the processors 22 and 24 and the voter logic 28. Logic device 36 allows the non-determinism of the processors 22 and 24 to exist, yet makes the processors appear to be in strict cycle-by-cycle lock step to voter logic 28. For example, logic device 36 allows the processors to present out of order but otherwise matching requests, and passes those requests to voter logic as if the requests were present in synchronism. Logic device 36 also allows the processors to continue execution in spite of lonely reads or lonely writes, yet triggers mechanisms (discussed more fully below) to ensure that the processors do not become too divergent. Further, logic device 36, in combination with software implemented on each processor, aids in the servicing of interrupts in spite of the non-determinism.

Figure 2:
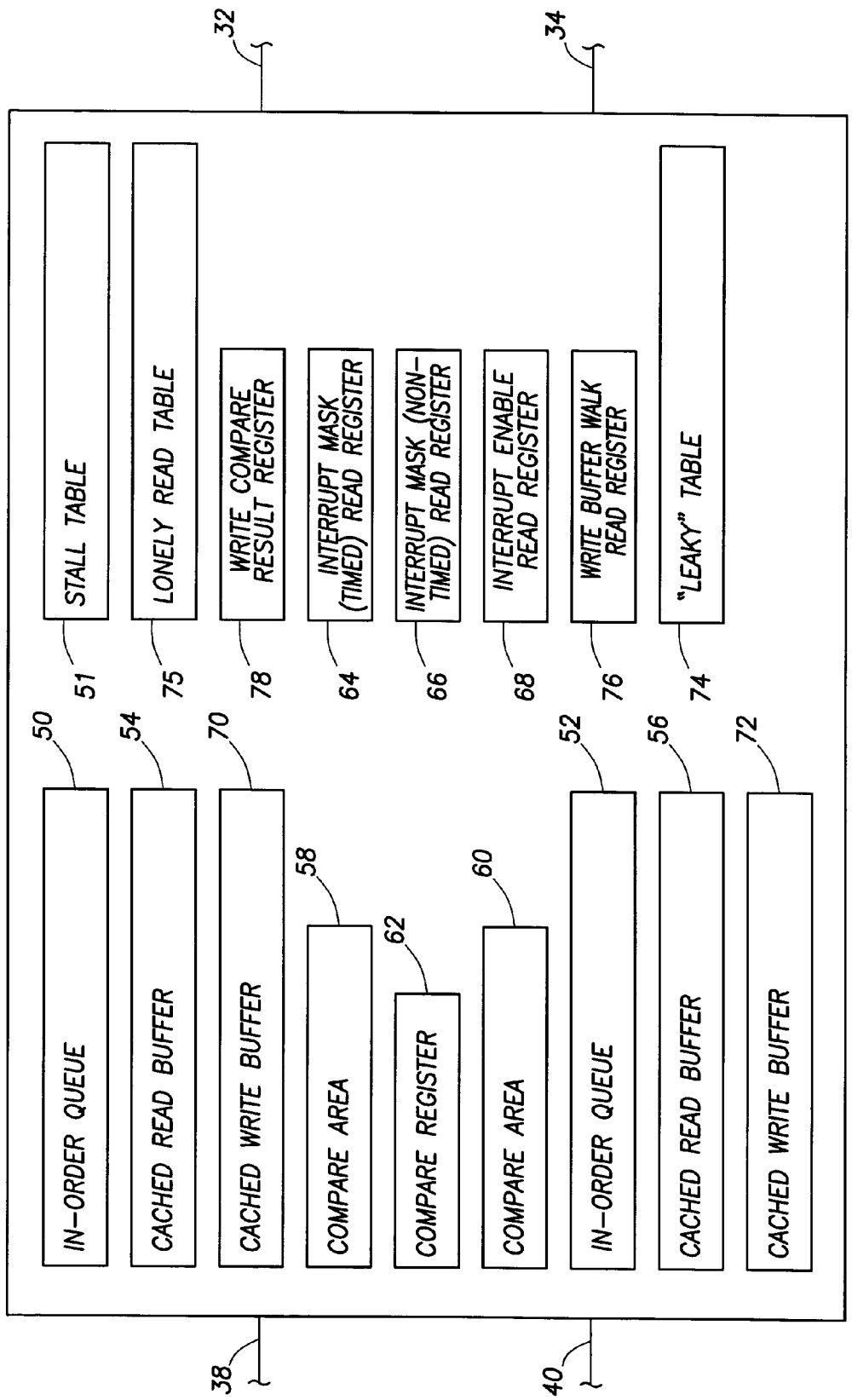
FIG. 2 shows illustrates an internal block diagram of a logic device in accordance with embodiments of the invention.

FIG. 2 illustrates a block diagram of functional components of logic device 36. The illustrative logic device 36 couples to the processors 22 and 24 (FIG. 1) by way of front-side buses 38 and 40 respectively. Likewise, in embodiments where an independent voter logic 28 is used, the logic device 36 couples to the voter logic by way of back-side buses 32 and 34. Logic device 36 also has a variety of registers, queues and buffers performing various functions, and each of these will be discussed in relation to one or more of the subsequent illustrative flow diagrams. The discussion begins with interrupt handling.

Logic device 36 in accordance with embodiments of the invention accepts all externally generated interrupts, e.g., from I/O adapters 14 and 16 or from other computer slices, and whenever possible passes the interrupts to each processor at times when the processors are most likely to be at the same C-point. Because servicing of an interrupt as between the processors should take place at the same C-point, internally generated interrupts asynchronous to program execution should be disabled on the processors 22 and 24.

Figure 3:
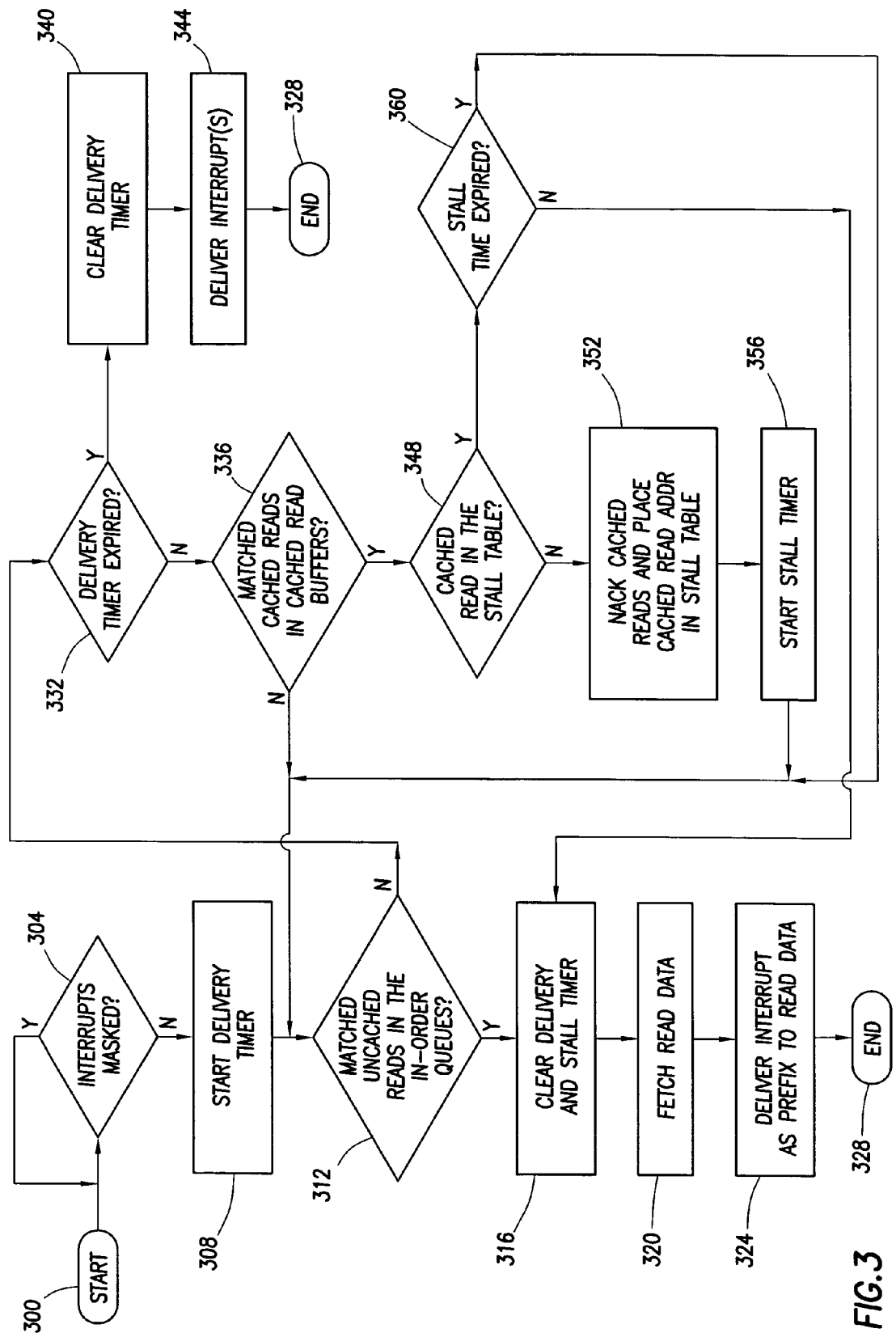
FIG. 3 illustrates a method to handle delivery of interrupts to the processors in accordance with embodiments of the invention.

FIG. 3 illustrates a method to handle delivery of interrupts to the processors that may be implemented by the logic device 36 in accordance with embodiments of the invention. In FIG. 3, or any of the figures of the specification, the order of the various illustrative steps may change, some of the illustrative steps may be combined, and others may be separated, all without departing from the scope and spirit of the invention. The illustrative method of FIG. 3 is preferably implemented as a hardware-based state machine, but in alternative embodiments logic device 36 may have an on-board microcontroller that performs the illustrative steps by executing software. In particular, the process starts (block 300) by the receipt of an interrupt from an external source, or possibly an interrupt generated internal to the logic device 36. Thereafter a determination is made as to whether assertion of interrupts to the processors is masked (block 304). If interrupts are masked, the illustrative system waits until interrupts are unmasked to continue processing. During the period of time when interrupts are masked and the logic device 36 is waiting, additional interrupts may be received and stored by the logic device for later assertion.

If interrupts are either not masked or become unmasked (block 304), an interrupt delivery timer is started (block 308). During the period of the interrupt delivery timer, the logic device 36 attempts to assert the one or more interrupts when the processors are likely to be at the same C-point. In particular, the illustrative process searches the in-order queues 50 and 52 (FIG. 2) for matched uncached reads (block 312). Uncached reads are reads where the read data is returned directly to the processor pipeline, and thus if there are matched uncached reads, it is highly likely that both processors are stalled at the same C-point waiting on the return of read data. If matched uncached reads are present, the delivery timer is cleared (block 316) and the read data is fetched (block 320) (in this case, the fetch may be from write buffers in the logic device 36, main memory or other devices). Thereafter, the one or more interrupts are delivered to the processors as a prefix to the read data (block 324), and the process ends (block 328). There are a few constraints as to ordering of uncached operations in the in-order queues, and these constraints are discussed with respect to FIG. 11.

Still referring to FIG. 3, and in particular block 312, if there are no matched uncached reads in the respective in-order queues (and skipping for now the determination of whether the delivery timer has expired (block 332)), a determination is made as to whether there are matched cache reads in the cached read buffers (block 336) (cached read buffers 54 and 56 of FIG. 2). If no matched cached reads are found, the process returns the determination of whether there are any uncached reads (again block 312). The illustrative process continues checking first for matched uncached reads (block 312) and second for cached reads (block 336), and if no matches are found, eventually the delivery timer expires (as found by the determination of block 332). When no matches are found within the delivery timer period, the delivery timer is cleared (block 340), the one or more interrupts are delivered (in this case without regard to the actual C-point of the processors) (block 344), and the process ends (block 328).

Delivery of interrupts to the processors by the logic device 36 (as illustrated in blocks 324 and 344) does not fully relieve the logic device 36 from responsibility. The one or more interrupts may need to be delivered again if the processors are unable to establish that they are at the same C-point, as discussed more below.

Still referring to FIG. 3, and in particular the determination of whether there are matched cache reads in the cached read buffers (block 336), matched cache reads are an indication that the C-points as between the processors could be the same if the requested read data is not supplied before it is needed by each processor. While read data for uncached reads are returned directly to the processor pipelines, read data for cached reads are returned to the processor's cache, and thus the processor may have presented the cached read speculatively. Each processor eventually stalls waiting on the return of the cached read data if it was non-speculative, and the stall is a C-point at which the one or more interrupts may be delivered. Thus, the presence of matched cache reads in the cached read buffers is not necessarily indicative that both processors are at the same C-point (e.g., stalled waiting for the return of data), but that they could soon be.

Various embodiments thus implement a delay method if cached reads are to be the basis for delivery of interrupts. In particular, if there are matched cached reads in the cached read buffers (block 336) (and skipping for the moment the determination of block 348), each processor is sent a NACK with respect to the cached read; and the cached read address is placed in a stall table (block 352) (Table 51 of FIG. 2). Sending a NACK to each processor regarding their respective cached read forces each processor to re-present if the cached read is non-speculative. Thereafter, a stall timer is started (block 356), and the process returns to look for uncached reads (block 312).

If uncached reads appear (block 312), the attempt to use the cached reads is abandoned, and instead the uncached reads are the basis for delivery of the one or more interrupts as previously discussed. If, however, there are still no matched uncached reads (block 312), and the delivery timer has yet to expire (block 332), the illustrative process checks for further matched cached reads (block 336). If matched cached reads are present, a determination is made as to whether the particular reads have been previously NACKed by checking for the read address in the stall table (block 348). If previously NACKed, a determination is made as to whether the stall timer has expired (block 360). If the cached reads are reasserted within the period of the stall timer it is likely that the cached reads are non-speculative and that both processors are stalled waiting on return of the data, and they become the basis for assertion of the one or more interrupts. Thus, the various timers are cleared (block 316), the read data fetched (block 320) (either from main memory, a write queue of the logic device 36, or other source), the one or more interrupts delivered as a prefix to the return of read data (block 324), and the process ends (block 328). If, on the other hand, the cached reads are reasserted (block 348), but outside the stall timer period (block 360), then the reassertion is not sufficiently contemporaneous to assume the processors are at the same C-point, and thus the process continues by looking for matched uncached reads (block 312).

The hardware and illustrative steps for asserting interrupts to the processors are all with respect to the logic device 36 and its attempt to assert the interrupts at times when the processors are most likely to be at the same C-point. There are situations, however, when the logic device 36 passes the interrupts even if there is no indication that the processors are at the same C-point (e.g., the delivery timer expires before finding an uncached or cached read pair to use as a basis). Thus, to further ensure that interrupts are handled at the same C point, each processor (in combination with the logic device 36) implements a mechanism to determine whether the processors are at the same C point prior to servicing of the interrupt—a synchronization check. In cases where the processors are not at the same C-point, further action is taken to force the processors to the same C-point.

Figure 4A:
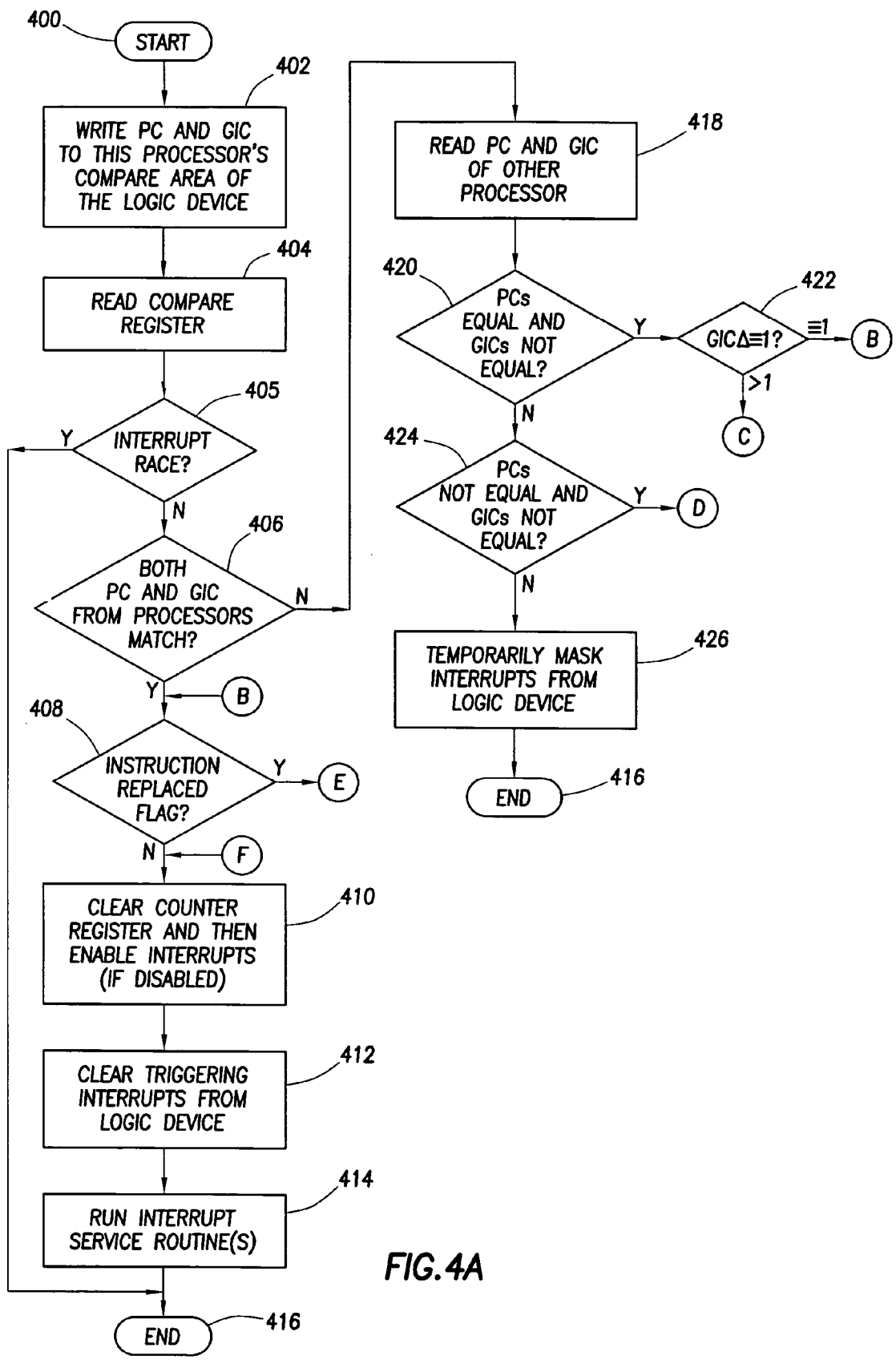
FIG. 4 (comprising FIGS. 4A-4C) illustrates a method to check, and if necessary correct, processor synchronization in accordance with embodiments of the invention.
Figure 4B:
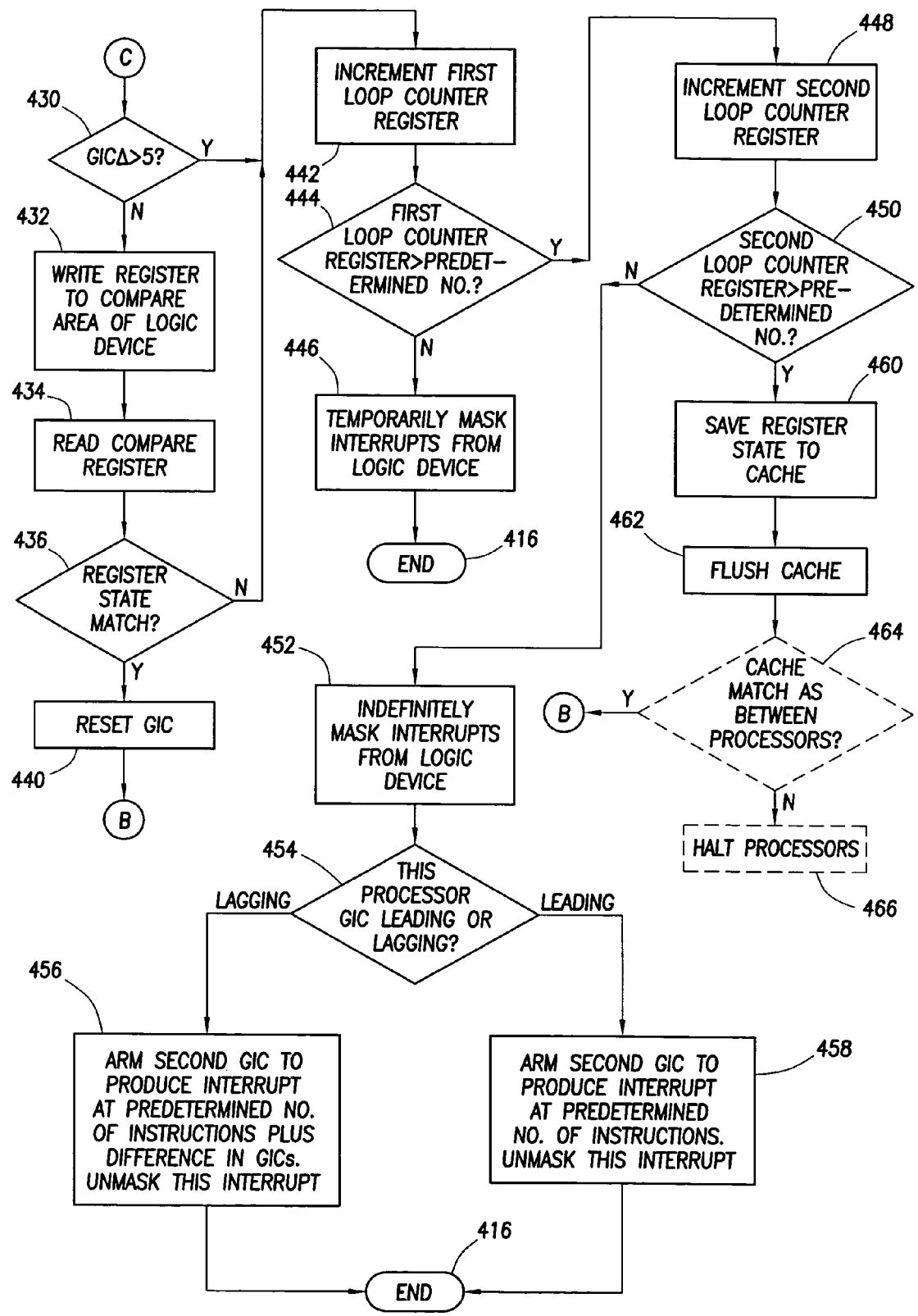
Figure 4C:
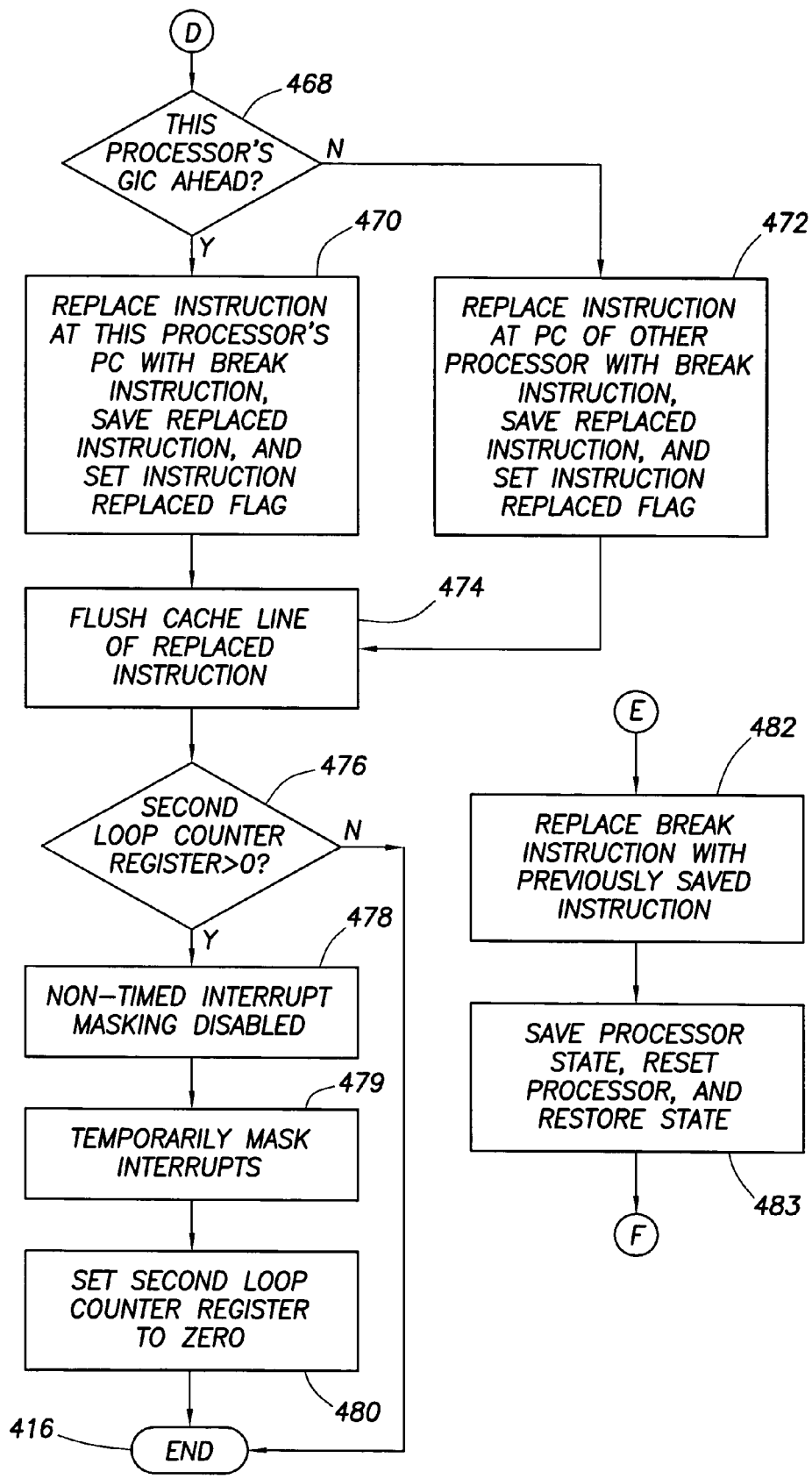

FIG. 4 (comprising FIGS. 4A-4C) illustrates a method that may be implemented by each processor in accordance with embodiments of the invention. The illustrative method determines whether the processors are at the same C-point prior to servicing of an interrupt, and if not, tries to force the processors to the same C-point prior to servicing the interrupt. Each processor of the computer slice 12 executes, substantially in lock step, a duplicate copy of the illustrative method of FIG. 4. The discussion that follows with respect to FIG. 4 is from the perspective of one processor with the understanding that each processor takes substantially the same steps, except where noted. In particular, the illustrative method starts in each processor by assertion of an interrupt to each processor by the logic device 36 (block 400 of FIG. 4A). Thereafter, the processor writes its program counter (PC) and graduated instruction counter (GIC) to a designated compare area within the logic device 36 (block 402). For example, one processor writes its program counter and graduated instruction counter to compare area 58 (FIG. 2), and the second processor writes its program counter and graduated instruction counter to compare area 60 (FIG. 2). The program counter of a processor points to the next instruction in the instruction stream to be executed, although the instruction may already be in the processor's pipeline. In accordance with embodiments of the invention, the graduated instruction counter of a processor is armed to increment upon completion of each instruction by the processor. The preferred MIPS® R16000™ processor has several available graduated instruction counters, and in this circumstance the graduated instruction counter is zeroed and armed after each verification that the processors are at the same C-point.

Still referring to FIG. 4A, in order to determine whether the program counter and graduated instruction counter written to the compare area are the same as the companion processor, each processor presents on operation, such as a read, to a designated compare register in the logic device 36 (block 404). The balance of this specification references presenting a read to the compare area; however, any operation presented that triggers an action by the logic device may be equivalently used. Referring briefly to FIG. 2, each processor presents a read to the address of the compare register 62. The logic device 36, in accordance with embodiments of the invention, interprets the read by each processor 22 and 24 to the compare register as a command to compare, possibly bit for bit, the contents of compare areas 58 and 60. If the contents are the same, the logic device 36 provides each processor an indication of such as read return data. If the contents of the compare areas are different, likewise the logic device 36 provides each processor an indication of such by return data. If there is an interrupt race as between the processors (an interrupt race being a situation where one processor sees an interrupt and begins the illustrative FIG. 4 while the other processor performs an operation indicative of having masked interrupts), the logic device 36 provides the one processor that received the interrupt an indication of the interrupt race. In some embodiments, the read to the compare register is an uncached or waited read, meaning that program execution in the processor pipeline stalls waiting for return of the read data. Read data is returned to each processor simultaneously (except in the interrupt race condition), and to the extent the two processors experience cycle slip each processor's waited read tends to bring the processors back into synchronism. Thus, in accordance with at least some embodiments of the invention, the initial determination of whether the program counters and graduated instruction counters are equal is performed by hardware. In alternative embodiments, each processor may make that determination independently by the exchange of program counter and graduated instruction counter data (as discussed more thoroughly below).

Returning again to FIG. 4A, a determination is thus made as to whether an interrupt race condition exists (block 405), and if so the illustrative method ends (block 416), to allow the processor in which the illustrative method is running to catch up with the companion processor. If there is no race condition, a determination is made as to whether the program counters and graduated instruction counters from each processor precisely match (block 406), possibly directly indicated by the returned read data. If the program counters and graduated instruction counters match, the processors are at the same C-point and the one or more interrupts that triggered execution of the synchronization check routines can be serviced. Skipping for now blocks 408 and 410 (as they are related to actions taken when the program counters and graduated instruction counters do not match), the illustrative method clears the one or more triggering interrupts from the logic device 36 (block 412), sets to execution one or more interrupt service routines (block 414), and the process ends (block 416).

Returning to the determination at block 406, if the program counters and graduated instruction counters do not match, then the processor reads the program counter and graduated instruction counter of the other processor (block 418). This read may be accomplished by reading the compare area for the companion processor from the logic device 36. In accordance with at least some embodiments, to read the program counter and graduated instruction counter of the other processor, each processor presents an uncached read to a predetermined read address that maps only to the logic device 36 compare area. The logic device 36, in turn, recognizes by the address of the read that the processor is requesting the data from its companion processor's compare area, and provides that data. Thus, each processor still executes in substantial lock step operation.

Once the program counter and graduated instruction counter from the companion processor are returned, a determination is made as to whether the program counters as between the two processors for the interrupted instruction stream are equal and the graduated instruction counters are not equal (block 420). If so, a determination is made as to whether the graduated instruction counters differ by exactly one instruction (GIC $\Delta \equiv 1$) (block 422). If the graduated instruction counters differ by exactly one instruction when the program counters are equal, the difference is attributed to a counting anomaly of the processor and the processors are assumed to be at the same C-point. The assumption is that there could not be a software loop so tight as to have program counters equal and yet have the graduated instruction counters off by only one instruction. One instruction as the threshold is merely illustrative, and other thresholds may be equivalently used if testing reveals that the assumption holds under such other thresholds. Skipping again for now blocks 408 and 410, the illustrative method clears the one or more triggering interrupts from the logic device 36 (block 412), sets to execution one or more interrupt service routines (block 414), and the process ends (block 416).

Returning to the determination at block 422, arrival at this step indicates that the program counters as between the processors are equal, but the graduated instruction counters are different. If the graduated instruction counters are off by more than one instruction (block 422), then the illustrative process attempts to force the processors back into synchronism. Referring now to FIG. 4B, if the graduated instruction counters are off by more than one instruction, a determination is made as to whether the graduated instruction counters are off by more or less than five instructions (GIC Δ>5) (block 430). If off by less than five instructions, this is an indication that the error is most likely just a counting anomaly of the graduated instruction counter, and the theory is tested by writing register state (contents of the various registers used by the interrupted program) to the logic device 36 (block 432) (e.g., writing to the respective compare areas 58 and 60), and the logic device is asked to compare the registers states by a read to the compare register 62 (block 434). Thereafter, a determination is made as to whether the register states are the same (block 436). If so, the theory regarding a counting anomaly is most likely correct, so the graduated instruction counter is reset (block 440), and (skipping again for now blocks 408 and 410) the one or more triggering interrupts are cleared from the logic device 36 (block 412 of FIG. 4A), one or more interrupt service routines are set to execution (block 414 of FIG. 4A), and the process ends (block 416 of FIG. 4A).

Still referring to FIG. 4B, if the graduated instruction counters are off by more than five instructions (block 430) or the register states do not match (block 436), then (skipping briefly blocks 442 and 444) the illustrative method temporarily masks delivery of interrupts from the logic device 36 (block 446) and the process ends (block 416), thus giving the processor more time to reach a corresponding C-point. Referring briefly to FIG. 2, temporarily masking interrupts is preferably accomplished by each processor presenting an uncached read to the timed interrupt mask read register 64. Each processor presenting a read to the timed interrupt mask read register 64 is interpreted by the logic device 36 as a request to temporarily mask interrupts to the processors. Thus, the logic device 36 arms a timer, and assertion of interrupts to the processors is masked for the period of the timer. After the timer period, at least the original interrupt is reasserted to the processors, thus starting anew the illustrative method FIG. 4. Referring again to FIG. 4B, the same conditions that triggered temporarily masking of interrupts may again be present, and thus the illustrative method may again find a graduated instruction counter difference greater than five (block 430) or register states that do not match (block 436). In accordance with some embodiments, temporarily masking interrupts takes place five times before other measures are taken, and to implement the five attempts a first loop counter register is incremented (block 442) prior to each temporary masking of interrupts. If the first loop counter register, possibly a software variable, has a value greater than a predetermined number (in some embodiments five) (block 444), further measures are taken, otherwise interrupts are again temporarily masked. If upon reassertion of interrupts the processors are at the same C-point (blocks 400-406 of FIG. 4A), then (skipping block 408) the various counter registers are cleared (and in particular the first loop counter register) (block 410 of FIG. 4A), the one or more triggering interrupts are cleared from the logic device 36 (block 412 of FIG. 4A), one or more interrupt service routines are set to execution (block 414 of FIG. 4A), and the process ends (block 416 of FIG. 4A).

Still referring to FIG. 4B, if temporarily masking interrupts a predetermined number of times to arrive at the same C-point is unsuccessful, each processor arms an internal interrupt to attempt to interrupt the instruction stream at the same C-point (discussed below with respect to blocks 454, 456 and 458). Much like temporarily masking interrupts, arming an internal interrupt is preferably only attempted a predetermined number of times (in some embodiments four), and thus the illustrative process increments a second loop counter (block 448). Thereafter, a determination is made as to whether the second loop counter has a value greater than a predetermined number (block 450). If less than the predetermined number, interrupts are indefinitely masked (block 442). Referring briefly to FIG. 2, indefinitely masking interrupts is preferably accomplished by each processor presenting an uncached read the non-timed interrupt mask read register 66. Each processor's presentation of a read to the non-timed interrupt mask read register 66 is interpreted by the logic device 36 as a request to mask interrupts to the processors. Returning to FIG. 4B, after masking interrupts (block 452) a determination is made as to whether the processor in which the illustrative process is running is leading or lagging in graduated instruction counter value (block 454). If the processor in which the illustrative process is running is lagging, a second graduated instruction counter is armed and set to generate an interrupt after a predetermined number of instructions, preferably 100 instructions, plus the amount the lagging processor's graduated instruction counter was different from the companion (in this case leading) processor, and this interrupt unmasked. Thus, for example, if the lagging processor's graduated instruction counter was ten instructions behind the leading processor, the graduated instruction counter is armed to trigger an interrupt after an illustrative 110 retired instructions. Moreover, assertion of this particular interrupt is unmasked.

Still referring to FIG. 4B, and in particular the determination of whether the processor's graduated instruction counter is leading or lagging (block 454), if the processor's graduated instruction counter is leading, a second graduated instruction counter is armed and set to generate an interrupt after a predetermined number of instructions, preferably 100 instructions, and assertion of this particular interrupt is unmasked. Thus, as between the two processors, each executes the predetermined number of instructions, and the lagging processor executes further a number of instructions by which the previous graduated instruction counters values indicated it lagged. When each processor is again interrupted, their respective program counters and graduated instruction counters should be close to the same values, if not an exact match. If at the same C-point after the further interrupt (as tested anew by the synchronization check of blocks 402 through 406 of FIG. 4A, and still skipping block 408), the various counters are cleared and the interrupts enabled (block 410 of FIG. 4A), the one or more triggering interrupts are cleared from the logic device 36 (block 412 of FIG. 4A), one or more interrupt service routines are set to execution (block 414 of FIG. 4A), and the process ends (block 416 of FIG. 4A). Keeping in mind that arrival at these steps is based on program counters being equal (block 420 of FIG. 4A), it is possible that each instruction stream is in a loop, but at different iterations of the loop. Allowing the lagging processor to execute more instructions may allow the lagging processor to catch up in the loop.

Still referring to FIG. 4B, and returning to the determination at block 450, if the second loop counter has a value greater than the predetermined number (preferably four), this means that interrupts have been temporarily masked a predetermined number of times (blocks 442 through 446), and there have been a predetermined number failed attempts to force the processors to the same C-point by triggering interrupts with a second graduated instruction counter in each processor. In this circumstance, the processors may nonetheless be at the same C-point, but this may not be unambiguously determined from the program counters and graduated instruction counters alone. Thus, the next step is for each processor to save the register state of the interrupt instruction stream to cache (block 460) and then flush all cache lines (block 462). As will be discussed with respect to handling of cached writes below, the logic device 36 compares writes (block 464, in dashed lines to indicate the step is not actually implemented in the processor executing the illustrative method of FIG. 4), and if any uncorrectable inconsistencies are found, one or both processors may be halted (block 466, in dashed lines to indicated implemented in logic device 36). Thus, the illustrative process assumes the C-points are the same, and skipping block 408, the various counter registers are cleared (block 410 of FIG. 4A), the one or more triggering interrupts are cleared from the logic device 36 (block 412 of FIG. 4A), one or more interrupt service routines are set to execution (block 414 of FIG. 4A), and the process ends (block 416 of FIG. 4A).

Returning to FIG. 4A, the discussion to this point covered the conditions of either the program counters and graduated instruction being the same (block 406), or the program counters being the same but the graduated instruction counters being different (block 420). However, if the both the program counters and the graduated instruction counters are different (block 424), the processors are unambiguously at different C-points, and attempts to bring the processors to the same C-point proceed along a different course than if the program counters match. Referring to FIG. 4C, if neither the program counters nor the graduated instruction counters match, a determination is made as to whether the graduated instruction counter in which the illustrative process is running is ahead of the graduated instruction counter in the companion processor (block 468). In some embodiments, the processor whose graduated instruction counter has the largest value is defined to be ahead. If ahead, the instruction pointed to by the program counter of the interrupted instruction stream of the processor in which the illustrative method is running is replaced with a break instruction, and the replaced instruction is saved (block 470). If the graduated instruction counter of the interrupted instruction stream of the processor in which the illustrative method is running behind, the instruction pointed to by the program counter of the companion processor (the processor that is ahead) is replaced in this processor with a break instruction, and the replaced instruction saved (block 472). Thereafter, the cache line containing the break instruction is flushed (block 474).

Still referring to FIG. 4C, it is possible that in a previous synchronization check and attempted C-point alignment that assertion of interrupts was indefinitely masked (e.g., block 452 of FIG. 4B). Before returning to allow each processor to proceed to the newly inserted break instruction, a determination is made as to whether assertion of interrupts was previous indefinitely masked by checking for a non-zero value of the second loop counter register (whose value is incremented each time just before indefinitely disabling interrupts). If the value of the second loop counter register is non-zero (block 476), the non-timed interrupt masking is disabled (block 478). Referring briefly to FIG. 2, disabling of the non-timed interrupt masking is preferably accomplished by each processor presenting an uncached read to the enable interrupts register 68 of the logic device 36. Each processor addressing a read to the enable interrupts register 68 is interpreted by the logic device 36 as a request to unmask assertion of interrupts to the processors. Returning to FIG. 4C, after enabling assertion of interrupts, it may be possible that several interrupts are in queue in the logic device 36. To give time for the newly placed break instruction to be executed, the illustrative process of FIG. 4 temporarily masks interrupts (block 479), the illustrative process time the second loop counter is set to zero, and the process ends (block 416). Each processor then resumes executing the previously interrupted instruction stream, and precise exception is asserted when each processor reaches its break instruction.

The break instruction causes assertion of an interrupt, which begins anew the synchronization check of FIG. 4A. If both program counters and graduated instruction counters match (block 406), then a determination is made as to whether an instruction of the instruction stream was previously replaced by a break instruction (block 408). In alternative embodiments, the precise exception itself indicates that an instruction has been replaced, and thus the illustrative determination of block 408 will not be needed. If there was a previous instruction replacement, the previously removed and saved instruction is re-inserted into the instruction stream (block 482 of FIG. 4C), the processor state is saved, the processor reset and the state restored (block 483), the various counter registers are cleared (block 410 of FIG. 4A), the one or more triggering interrupts are cleared from the logic device 36 (block 412 of FIG. 4A), one or more interrupt service routines are set to execution (block 414 of FIG. 4A), and the process ends (block 416 of FIG. 4A).

Referring again to FIG. 4A, the final situation with respect to the program counters and graduated instruction counters is that the program counters are not equal, but the graduated instruction counters are the same. Little information regarding the relative C-points of the processors can be gleaned from these circumstances, and therefore interrupts are temporarily masked (block 426) and the process ends (block 416) in the hope that when the timer of the logic device expires (thus reasserting interrupts), and the illustrative method of FIG. 4 begins again, the program counters and graduated instruction counters will be such that the relative C-point can be determined or forced to be the same.

Summarizing before continuing, before executing an interrupt service routine, each processor performs a synchronization check. If the processors are unambiguously at the same C-point, the one or more triggering interrupts are serviced. If the processors are not unambiguously at the same C-point, one of three situations exist: matching program counters and non-matching graduated instruction counters; non-matching program counters and non-matching graduated instruction counters; or non-matching program counters and matching graduated instruction counters. In the latter case, little information regarding relative C-point can be determined, and so interrupts are temporarily disabled hoping that in subsequent synchronization checks the processors will be at the same C-point, or information can be gleaned regarding their relative C-points.

If there are matching program counters and non-matching graduated instruction counters, the processors may or may not be at the same C-point, and the action taken is dependent upon the amount the graduated instruction counters are different, and how many times the situation is present. If the graduated instruction counters are off by only one instruction, the processors are assumed to be at the same C-point and servicing of interrupts begins. If the graduated instruction counters are off by more than one but less than five, the processors are theorized to be at the same C-point, and the theory is checked by comparing register states. If the register states match the processors are assumed to be at the same C-point and servicing of interrupts begins. If the processors are off by more than five instructions, or the register states do not match, a predetermined number of attempts are made to allow the processors to synchronize on their own by temporarily masking interrupts and allowing the interrupted instruction stream to continue processing. If the attempts at temporarily masking interrupts do not allow the processors to reach the same C-point, and the processors are still off by more than five instructions (or their register states do not match), a second graduated instruction counter in each processor is armed based on the difference of the graduated instruction counters (armed at different counts) to trigger an interrupt and therefore another synchronization check. Arming a second graduated instruction counter in each processor is attempted a predetermined number of times.

If temporarily masking interrupts a predetermined number of times and arming an interrupt based on the a second graduated instruction counter in each processor fail to unambiguously bring the processors to the same C-point (again for the situation where the program counters match), the register states are saved to cache, the cache flushed, and the processor begins the steps of servicing the various interrupts. If, however, writes of the cache flush do not match, as determined by the logic device 36 performing its write comparison duties, the processors are halted.

Finally, if the program counters are not equal and the graduated instruction counters are not equal, break instructions replace particular instructions in the interrupted instruction stream, and the instruction stream is again allowed to continue execution in each processor. The break instructions are strategically placed to cause an interrupt at the same C-point, and thus at the break instruction caused interrupt, the two processors should be at the same C-point.

The discussion now turns to handling reads and writes from the processors. When in lock step, processors present corresponding operations at substantially the same clock signals. However, non-deterministic behavior of a processor may cause differences in presentation that are not necessarily indicative of a fault as between the processors. Read and write operations come in several classes: cached reads; uncached reads; cached writes; and uncached writes. Uncached reads and writes to the internal registers, buffers and queues of the logic 36 need not be lock stepped, or in some cases even matched. For example, as discussed above with respect to determining the C-point of the processors, different or divergent data may be written by each processor to the compare areas 58 and 60 (FIG. 2). As a further example, if a processor experiences and detects an internal error, the processor informs the logic device 36 by a write to a designated register, which is thus not a matched write.

Figure 5:
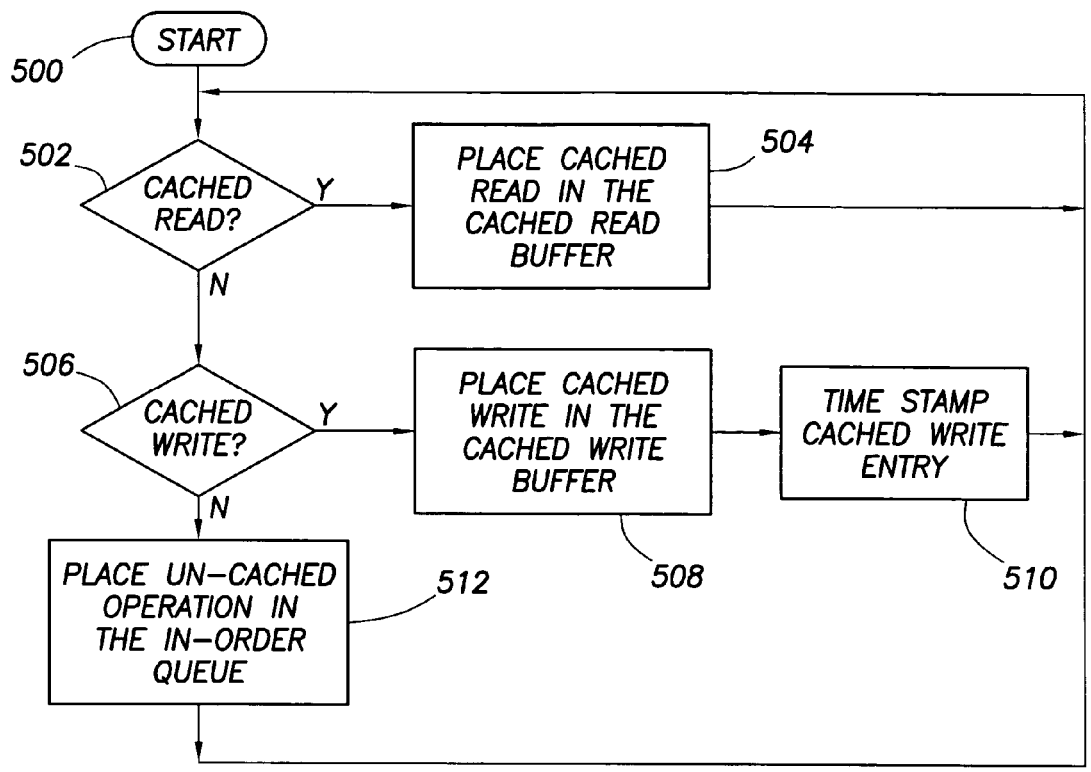
FIG. 5 illustrates a method of accepting reads and writes, and placing those reads and writes, in accordance with embodiments of the invention.

Other reads and writes, however, such as reads and writes that map to main memory and/or I/O adapters, should be matched as between the processors. Returning briefly to FIG. 1, as each processor performs a read or write operation, those respective operations are presented on each processor's processor bus. Thus, processor 22 presents reads and writes to the logic device 36 by way of processor bus 38, and processor 24 presents reads and writes to logic device 36 on processor bus 40. FIG. 5 is an illustrative flow diagram of a method of accepting reads and writes by the logic device 36, and placing those reads and writes in appropriate areas for further processing. No analysis or action is taken by the illustrative method of FIG. 5 respecting non-deterministic behavior of the processors. These aspects are discussed more thoroughly below.

The illustrative method of FIG. 5 starts (block 500) by one of the processors presenting a read or write on its respective processor bus. A determination is made as to whether the presented operation is a cached read (block 502). A cached read is the read of a cache line of data, which read may be speculative and thus is not necessarily indicative of the state of the pipeline of the processor. In accordance with embodiments of the invention, cached reads presented out of order as between the processors, and a cached read by one processor without a matching read from the second processor, are not necessarily indicative of a fault (though voter logic 28 may see out of order cached reads as a fault). The illustrative method of FIG. 5 places cached reads from a processor in its respective cached read buffer (block 504). Referring briefly to FIG. 2, cached reads from processor 22 presented on processor bus 38 are placed in cached read buffer 54. Likewise, cached reads from processor 24 presented on processor bus 40 are placed in cached read buffer 56. Handling of the cached reads (whether a single read or a match pair) is discussed below with respect to FIG. 6.

Returning to FIG. 5, if the presented operation is not a cached read (block 502), a determination is made as to whether the presented operation is a cached write (block 506). A cached write is the victimization of a cache line from the processor's cache. In accordance with embodiments of the invention, cached writes presented out of order as between the processors, or a cached write by one processor without a matching write from the second processor, are not necessarily indicative of a fault (although voter logic 28 may see out of order cached writes as a fault). The illustrative method of FIG. 5 places cached writes from a processor in its respective cached write buffer (block 508) and time stamps the entry (block 510). Referring briefly to FIG. 2, cached writes from processor 22 presented on processor bus 38 are placed in cached write buffer 70. Likewise, cached writes from processor 24 presented on processor bus 40 are placed in cached write buffer 72. Handling of the cached writes (whether a single read or a match pair) and the purpose of the time stamp of each cached write entry are discussed with respect to FIG. 8.

Returning to FIG. 5, if the operation presented is neither a cached read nor a cached write, then the presented operation is an uncached read or an uncached write, and in accordance with the illustrative method of FIG. 5 these operations are placed in each processors in-order queue (block 512). Unlike cached operations, uncached reads and writes are a more direct indication of the state of the processor's pipeline, and in most cases are directed to register space of the logic device 36 (although they may also be directed to the main memory or I/O adapters). Referring briefly to FIG. 2, uncached operations (both reads and writes) from processor 22 presented on processor bus 38 are placed in in-order queue 50. Likewise, uncached operations (both reads and writes) from processor 24 presented on processor bus 40 are placed in in-order queue 52. Handling of the uncached operations is discussed with respect to FIG. 11.

FIG. 6 is an illustrative flow diagram of a method, implemented by logic device 36, of handling cached reads in their respective buffers, as placed by the illustrative method of FIG. 5. In particular, the method starts (block 600) each time the logic device 36 is powered-on, and the illustrative method then watches each cached read buffer for the placement of a cached read (block 604). When a cached read is detected in either buffer (either as a single read or a matched read from both processors), the logic device requests the read data (block 608). If the requested data is present in the logic device 36, there may be no need to request the data from the voter/memory. Even if only one of the processors presents the cached read, the logic device 36 begins the process of obtaining the read data as if each processor presented a matched cached read in precise lock step. For example, the logic device 36 may present a single read to the voter logic 28 as matched reads in lock step across buses 32 and 34 (FIG. 1). Thereafter, the illustrative process waits for the return of the cached read data (block 612). After return of the cached read data, a determination is made as to whether there is a corresponding cached read in the second cached read buffer (block 616). If there is a corresponding read in the second cached read buffer, each processor is delivered the cached read data in lock step (block 620), and the process ends (block 624). In at least some embodiments, however, the process immediately begins anew by watching each cached read buffer for the placement of a cached read (block 604).

In most cases, requesting read data involves presenting the cached read in lock step across buses 32 and 34 (FIG. 1). In some cases, however, the requested read data may be present in the logic device 36 in the form of a cached write. If present, the data returned is from the cached write. In particular, if one processor evicts a cache line but the second processor does not, the evicted cache line is given to the logic device 36 as a lonely cached write. If both processors thereafter request the data by way of a cached reads, the data returned to the processor whose corresponding cached write is waiting and unmatched (discussed below with respect to FIG. 8) is provided the data of its cached write, and the second processor is provided data from main memory. This illustrative situation is a rare occurrence, and is not shown in FIG. 6 so as not to unduly complicate an understanding of the invention. The situation and reaction is presented, however, as it comes into play with respect to difficulties respecting cached writes, as discussed with respect to FIG. 8.

Returning to the determination of whether there is a corresponding read in the second cached read buffer (block 616), if by the time the cached read data is returned (or found within the logic device 36) the second processor has yet to present a corresponding read, it is assumed that the single cached read is a speculative read on the part of one processor, where that speculation was not matched by the second processor. Because the single read is assumed to be speculative (and skipping for the moment block 628), the address of the cached read is placed in a "leaky" table (block 632), and the requesting processor is NACKed (block 636). If the cached read was non-speculative, the processor will re-submit the cached read request. If the cached read was speculative, the processor may have executed forward to the point of determining that the speculatively requested cache line is not needed, and thus the request will not be re-submitted. The delay implemented by the NACK also gives the second processor time to present its corresponding cached read, if any. Assume for purposes of explanation that at least one of the processors requested the cache line non-speculatively yet it was NACKed, the cache read is resubmitted, and yet the second processor still has not made a matching request. Thus, the illustrative process of FIG. 6 runs again, including requesting the read data from the voter logic 28 (block 608). When it is determined that the second processor did not present a matching read (block 616), a determination is made as to whether the address of the cached read is present in the "leaky" table (block 628). Because under the assumptions for this portion of the description the cached read was previously NACKed, the address of the read will indeed be present in leaky table. Thus, the presence of an address in the leaky table is indicative of a cached read being NACKed at least one time in the past. If the address is present, the data is nonetheless returned to the requesting processor (block 640), the address of the cached read is placed in a lonely read table (block 644), and an interrupt is issued to both processors indicating that one processor presented at least twice a lonely cached read (block 648). A condition that could cause this situation is cache non-determinism, where the non-requesting processor already has the cache line requested because it did not overwrite or evict the cache line when the requesting processor did.

Before a discussion of the illustrative method triggered by the issuance of the interrupt to each processor, a further description of the leaky table is in order. In particular, and referring to FIG. 2, logic device 36 comprises a leaky table 74 and lonely read table 75. The table is labeled "leaky" because, in accordance with embodiments of the invention, each time an entry is placed in the leaky table 74 a timer is started for that entry. After a predetermined period of time, the entry is either removed or tagged as invalid by the logic device 36, and the entry may be overwritten. Thus, the logic device 36 allows entries to "leak" out of the leaky table based on how long each entry is present. If the illustrative process of FIG. 6 has a second lonely read before the leaky table entry is removed or tagged as invalid, then the illustrative steps of blocks 640, 644 and 648 are performed. If, however, the entry is removed or tagged as invalid before the lonely read is again asserted, it is as if the illustrative process sees the lonely read for the first time, and the illustrative steps of blocks 632 and 636 are performed.

Figure 7:
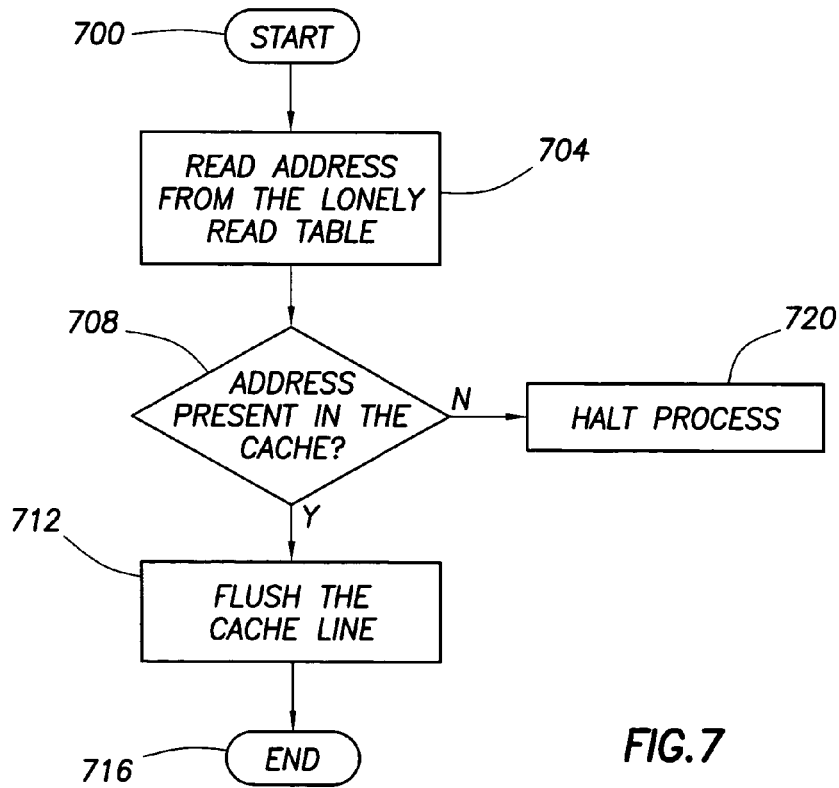
FIG. 7 illustrates a method implemented after the receipt of an interrupt indicating a lonely read.

FIG. 7 is an illustrative flow diagram of a method implemented by each processor after receipt of the interrupt (block 648) indicating a lonely read. In particular, the process starts by issuance of the interrupt from the logic device 36 (block 700). After performing the various steps to check, and if necessary correct, the C-point as between the processors as illustrated in FIGS. 4A-4C (not specifically shown in FIG. 7), each processor reads the address from the lonely read table 75 (block 704). Thereafter, a determination is made as to whether the address from the lonely read table is in the processor's cache (block 708). For the processor that made the lonely cached read, the cached read address will be present. The presence of the cache line in the cache of the non-requesting processor is less certain. If the address exists in a cache line of cache of the processor, the illustrative method flushes at least that cache line (block 712), and the process ends (block 716). Thus, if each processor indeed has and needs the cache line, each will immediately issue a cached read for the same cache line, which should be a matched request. If one processor does not have the address in its cache (again block 708), this is indicative of serious misalignment of the execution of the processors, and thus the process halts one or both processors (block 720).

Summarizing before continuing, when the logic device 36 receives a cached read, the logic device 36 requests the data from the voter logic 28 and/or main memory 26. If by the time the read data is returned the second processor has presented a matching cached read, the read data are returned in lock step to each processor. If by the time the read data is returned the second processor has yet to make a matching request, it is assumed the single cached read is speculative, the request is NACKed, and a notation made of the NACK by placing the at least the address of the read in the leaky table. If subsequently only one processor again presents the cached read, the data is provided to the requesting processor, and an interrupt issued to both processors indicating a potential C-point alignment problem. If subsequently both processors present the cached read, the data is provided, and by its own operation the leaky table removes or invalidates the address of the NACKed read. Upon receiving an interrupt that indicates one processor made a lonely read, each processor searches its cache for, and flushes if present, the cache line at issue, thus forcing each processor to present a cached read for the data, which should be matching. The order in which the processors present their cached reads is of no concern.

Figure 8:
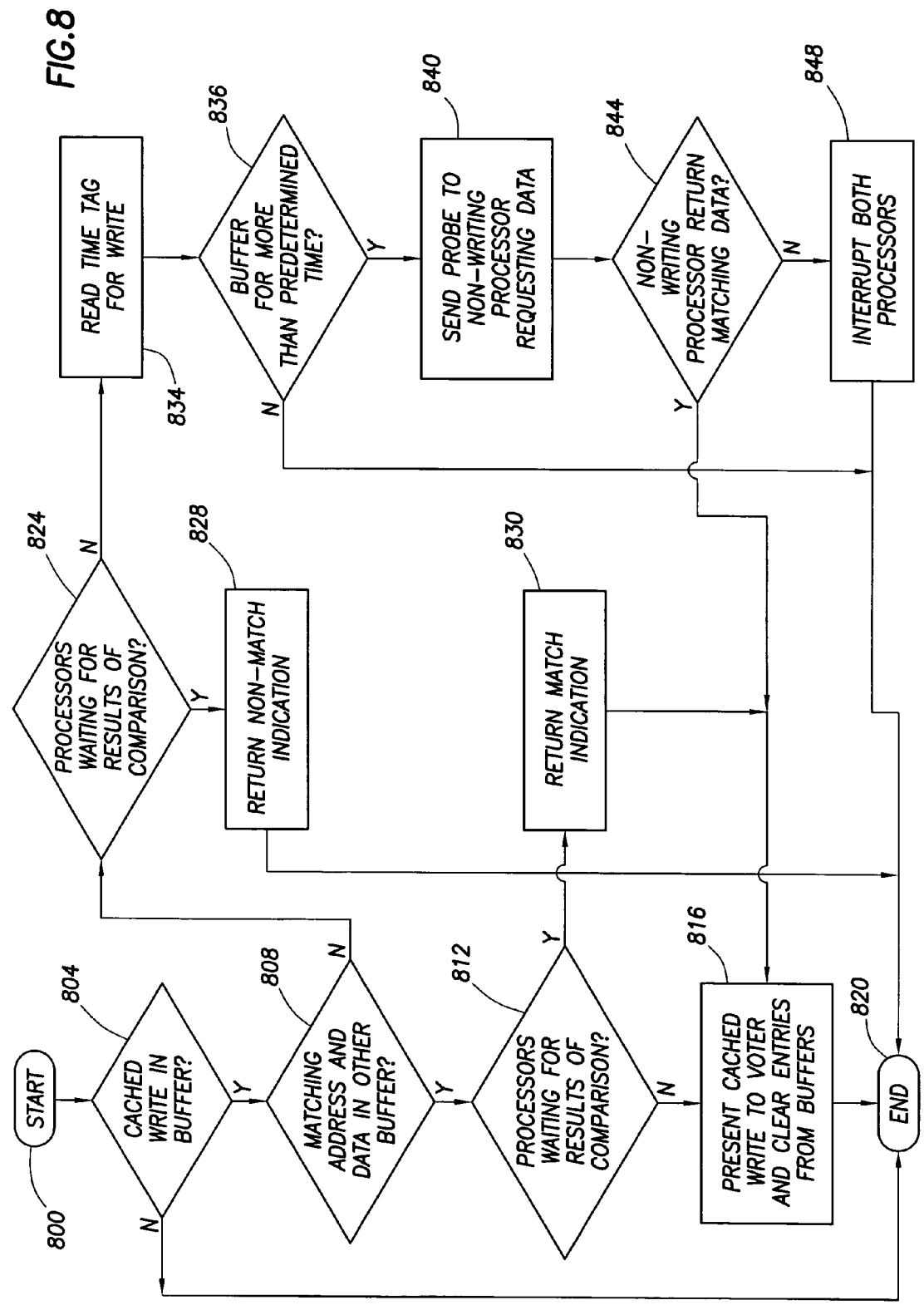
FIG. 8 illustrates a method of handling cached writes in accordance with embodiments of the invention.

Turning now to cached writes, FIG. 8 is an illustrative flow diagram of a method, implemented by the logic device 36, for handling cached writes. In particular, the method starts (block 800) each time the logic device 36 is powered-on, and the illustrative method then looks for a cached write in a cached write buffer (block 804). If no cached write is found, the illustrative method ends (block 820), to be immediately restarted, and possibly to look for cached writes in the other cached write buffer. If a cached write is found (block 804), the illustrative method determines if there is a matching write in the other cached write buffer (block 808). For example, if the illustrative method first inspects cache write buffer 70 (of FIG. 2) for processor 22 and finds a cached write, then the method inspects cached write buffer 56 (of FIG. 2) for a matching request. Determining whether cached writes match may take many forms. In some embodiments, a match is considered found when the addresses exactly match, and cyclic redundancy check codes run on each cache line are the same. In alternative embodiments, a bit-for-bit comparison is completed to ensure a match.

Still referring to FIG. 8, if the cached writes match (and skipping for now the determination of block 812), the logic device 36 presents the cached writes to the voter logic 28 in lock step (block 816), and the process ends (block 820), to be immediately restarted.

Returning to the determination of whether there is a matched write in the second buffer (block 808), if no matched write is present (and skipping for now the determination at block 824), the time tag for the cached write is read (block 834). If the cached write has been in its respective cache write buffer less than a predetermined amount of time (block 836), then the process ends (block 820). Because the processors of the various embodiments are not necessarily in cycle-by-cycle lock step, and because of non-deterministic behavior of some processors, there may be a time lag between each processor sending a cached write to the logic device 36, but this time lag is not necessarily indicative of a fault. Thus, embodiments of the invention allow time for the second processor to sends its corresponding cached write (if any).

If the cached write has been in the buffer longer than the predetermined period of time (again block 836), then the illustrative method sends a cache probe command to the processor that did not provide a matching cached write (block 840). One possible explanation for the difference in behavior is cache non-determinism. That is, one processor may have evicted a cache line (possibly to be overwritten by a new cache line), and the second processor may have chosen a different location for the corresponding new cache line. In this case, each processor produces a lonely write. The cache probe is received by a cache control engine in the processor, which then searches its cache for corresponding data. If found, the cache line is evicted and which generates a cached write. The logic device 36 then determines whether the cached write in response to the cache probe (if any) matches the cached write that triggered sending the probe (block 844). If the cached writes match, the logic device 36 presents the writes to the voter logic 28 (block 816), and the process ends (block 820). If, however, the cached writes do not match, or no cached write was sent in response to the cache probe (block 844), then both processors are sent an interrupt (block 848) so that they may take further action.

Figure 9:
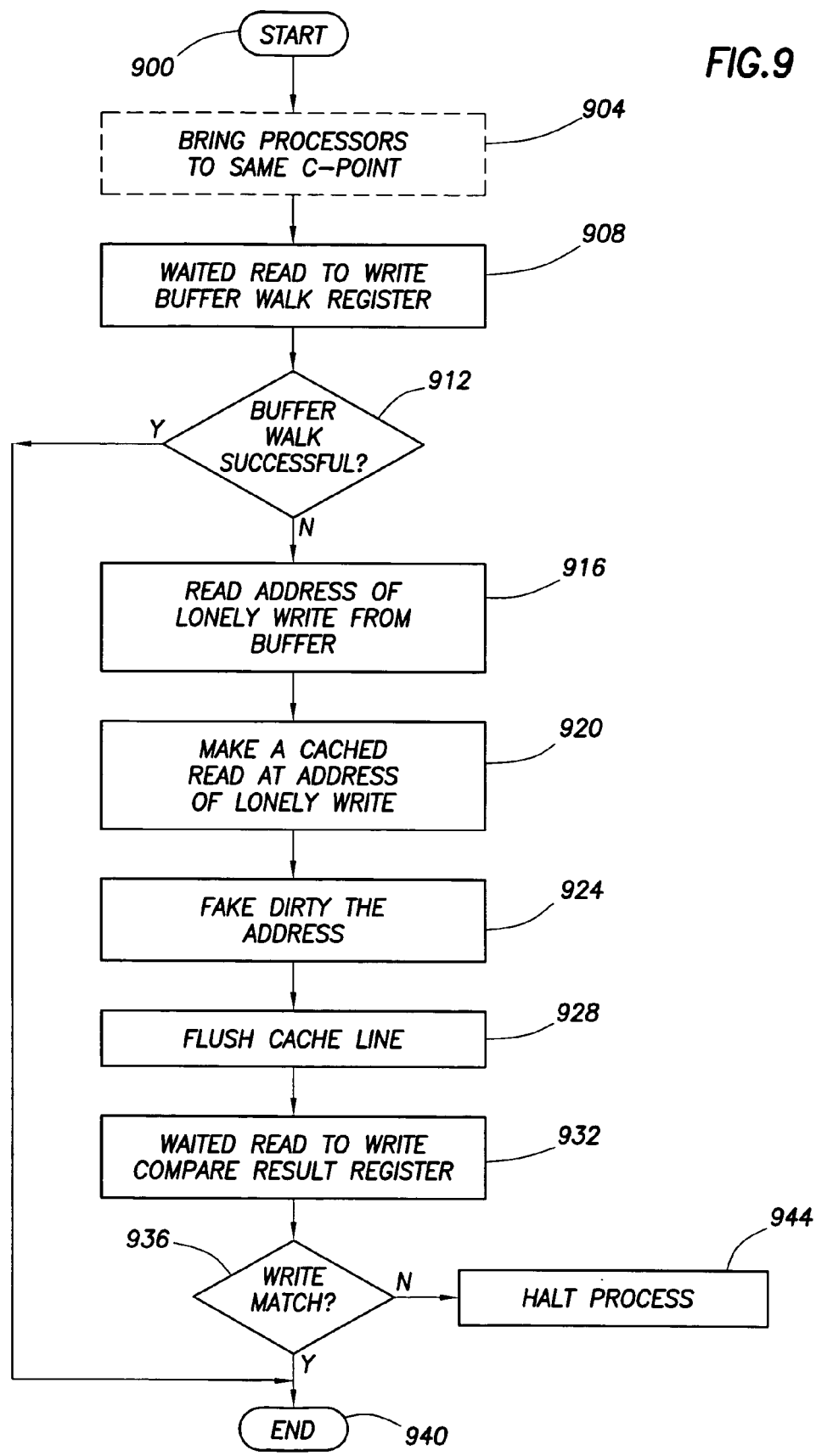
FIG. 9 illustrates a method implemented after receipt of an interrupt indicating a lonely cached write in accordance with embodiments of the invention.

FIG. 9 is an illustrative flow diagram of a method implemented by each processor after receipt of an interrupt (block 848) indicating a lonely cached write. In particular, the process starts by issuance of the interrupt from the logic device 36 (block 900). Each processor then executes the various steps to check, and if necessary correct, the C-point as between the processors as illustrated in FIGS. 4A-4C (block 904). An interrupt signaling a lonely cached write is indicative of the two processors being out of synchronism. Thus, issuance of an interrupt by the logic device 36 (block 848 of FIG. 8), and bringing each processor to the same C-point (if possible) (block 904), may force the lagging processor to send its matching cached write to the logic device 36. After reaching the same C-point each processor commands the logic device to again check the cached write buffers for matching writes, and the command is presented by an uncached read to the write buffer walk register (block 908). Referring briefly to FIG. 2, the write buffer walk register 76 is an internal register of the logic device 36. Each processor sending an uncached read targeting the write buffer walk register 76 triggers the logic device 36 to implement the illustrative method of FIG. 10. Thus, the description turns to an explanation of the logic device's actions taken in response to each processor sending an uncached read targeting the write buffer walk register 76. After a description of the write buffer walk by the logic device, the description returns to the FIG. 9. Because the logic device does not return any read data triggered by the uncached read (block 908) until the results of the write buffer walk are completed, each processor stalls.

Figure 10:
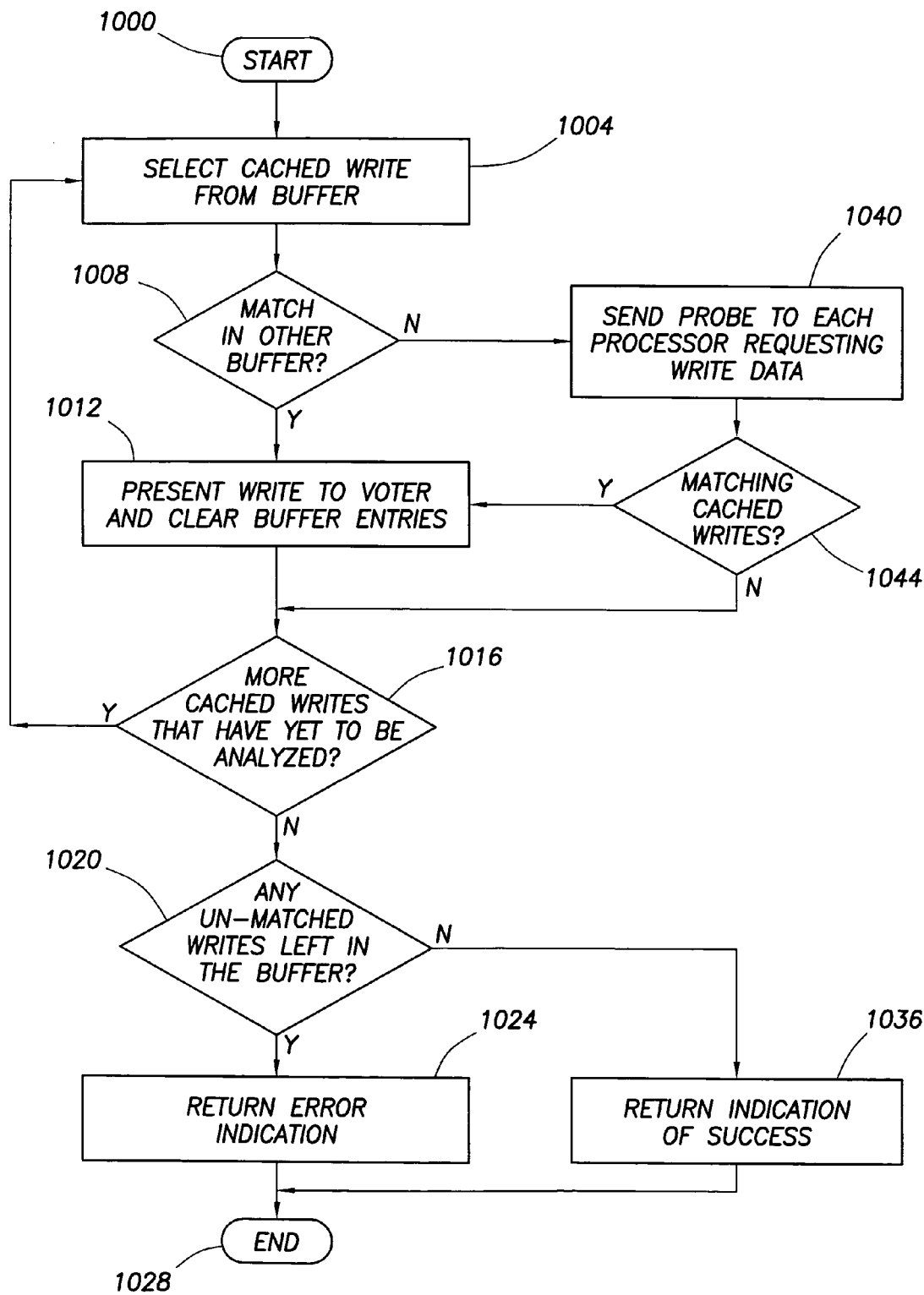
FIG. 10 illustrates a method of a buffer walk algorithm in accordance with embodiments of the invention.

FIG. 10 is an illustrative flow diagram of a method, implemented by the logic device 36, after each processor is interrupted and reaches the same C-point. In particular, the process starts by each processor sending an uncached read to the logic device 36 targeting the write buffer walk register (block 1000). Thereafter, the logic device 36 selects a cached write from a cached write buffer (block 1004), and then looks for a matching cached write in the second buffer (block 1008). If a matched write is found, the logic device presents the write to the voter logic and clears those entries from each buffer (block 1012). After presenting, a determination is made as to whether more cached writes exist in either cached write buffer that have yet to be analyzed (block 1016). If so, the process begins anew by selecting a cached write (block 1004). If all the cached writes from both cached write buffers have been analyzed, a determination is made as to whether there are any unmatched cached writes in either cached write buffer (block 1020). If not, bringing the processors to the same C-point was successful in correcting any difference between the processor. Thus, the logic device sends to each processor (as the data of the uncached read) an indication of success (block 1036). If there are still unmatched cached writes in the either or both the cached write buffers (again block 1020), then bringing the processors to the same C-point was unsuccessful in correcting the difference between the processors. Thus, the logic device sends to each processor (as the data of the uncached read) an indication of an error (block 1024).

Still referring to FIG. 10, and in particular the determination of whether a matching cached write is found in the second buffer (block 1008), if no matching cached write is found, the logic device sends a cache probe to each processor requesting the data at the cache line of the lonely cached write (block 1040). As discussed above, even though the two processors are at the same C-point, cache non-determinism may produce non-matching cached writes, and thus the cache probe is sent in the hope that the second processor does indeed have the data, and the cache probe will therefore produce the matching write. If indeed a matching write is produced (block 1044) based on the cache probe, then the illustrative method presents the writes to the voter logic (block 1012). If the cache probe fails to produce a matching write, the process continues with a determination of whether more cached writes exist that have yet to be analyzed (block 1016). In the illustrative case where no matching cached write is produced by the cache probe, the determination of whether an unmatched cache writes are left in the buffer (block 1020) will be true, thus forcing return of data indicating failure.

Returning now to FIG. 9, while the illustrative method of FIG. 10 operates, each processor is stalled (at block 908) waiting on read return data. Once returned, a determination is made as to whether the illustrative method of FIG. 10 was successful (block 912). If successful, all possible contingencies regarding the cached writes have been resolved, and the process ends (block 940).

Even though the illustrative methods of FIGS. 9 and 10 discussed to this point may have been unsuccessful in resolving a lonely cached write, it is still possible that because of cache non-determinism, and in particular speculative dirtying of a speculatively fetched cache line, that the lonely cached write may still not be indicative of a fault between the processors. To eliminate this possibility, and still referring to FIG. 9, each processor reads from the cached write buffer of the logic device the address of the lonely cached write (block 916). Thereafter, a new cached read is sent (block 920) (by each processor) to the logic device targeting the address of the lonely cached read. One of the processors produced the lonely cached write, and as discussed with respect to FIG. 6 the logic device 36 preferably supplies to that processor a copy of the data from its lonely cached write (as part of the cache coherency protocol). The logic device delivers to the second processor the data from main memory. Each processor then "fake" dirties the data at the address (block 924), such as by reading the data into a processor register, and immediately writing the same data back. Each processor then evicts the cache line (block 928), producing a cached write from each processor that is handled by the illustrative process of FIG. 8. Each processor, as part of the interrupt service routine, then makes an uncached read to a write buffer walk register (block 932). Much like the previous uncached reads, each processor then stalls waiting on return of data.

Returning to FIG. 8, in originally discussing FIG. 8, the illustrative determination of blocks 812 and 824 were skipped. These determinations work together with the illustrative interrupt service routine of FIG. 9 to help the interrupt service routine determine whether the interrupt triggered cached writes match, when in most circumstances the processor sends cached writes and continues other processing. In particular, after finding matching cached writes (blocks 804 and 808), a determination is made by the logic device 36 as to whether the processors are each waiting for an indication of success or failure of the comparison step (block 812). This determination may be made by determining whether each processor has made an uncached read to the write compare result register 78 (of FIG. 2). If the processors are waiting for results, a match indication is presented (block 830), and the process moves to presenting the cached writes to the voter logic (block 816). Conversely, if no match is found for the selected cache write (block 808), the illustrative method again makes a determination as to whether the processors are each waiting for an indication of success or failure of the comparison step (block 824). If so, the illustrative method returns a non-match indication, and the process of illustrative FIG. 8 ends.

Returning to FIG. 9, and in particular where each processor performs the waited read (block 932), once the illustrative method of FIG. 8 returns an indication, a determination is made as to whether the cached writes generated by the reading and "fake" dirtying of the cache lines produced matching cached reads (block 936). If so, the lonely cached write was indeed the manifestation of cache non-determinism, and the process ends (block 940). If the cached writes did not match, this is indicative of a fault in one of the processors, so the processors are halted (block 944).

Summarizing before continuing, when the logic device 36 receives a cached write, the logic device 36 places the cached write in its respective buffer and also associates a time tag with the cached write. In some embodiments, a process implemented by the logic device 36 looks for cached writes in the cached write buffers 70 and 72. If a cached write has a matching cached write in the second buffer, those writes (and any others that match) are presented to the voter logic 28. If a cached write does not have a match, a certain amount of time is allowed for the matching cached write to be sent from the second processor. If no matching cache write is sent in the predetermined time, the logic device issues a probe command to the second processor requesting the data, which may trigger the second processor's sending of the cached write. If the cache probe fails to produce a matching write, the logic device issues an interrupt to the processors. The interrupt issued by the logic device initiates a synchronization check, and if necessary alignment of the C-points. After reaching the same C-point, an interrupt service routine triggers a "buffer walk," which forces the logic device to again check the cached write buffers for matching requests. Where matching requests are found, they are presented to the voter logic. If non-matching requests are still present, the interrupt service routine in each processor determines the address of the lonely cached write, and issues a cached read for the data. After return, each processor "fake" dirties and evicts the data, thus triggering cached writes from each processor. The logic device again compares the cached writes, and presents them to the voter logic if they match. If they do not match, an unrecoverable error has occurred, and the processors are halted. Thus, even if the cached writes are presented out of order (with respect to other cached writes), at different times, or if a single cache read is presented, it is not necessarily a fault condition. The logic device 36 and/or software executed on the processors ensure, to the extent possible, that no faults are present, and allow execution of the program to continue.

The discussion now turns to uncached reads and writes. Unlike cached reads and writes where the operation may take place somewhat independently of processing in the processor's pipeline, uncached operations are a direct reflection of the status of the processor's pipeline. In cases of an uncached read, processing stalls waiting for return of data. Uncached operations, in most cases, are directed to internal registers of the logic device 36, though uncached operations may also target I/O adapters and main memory. FIG. 5 discusses placing of uncached operations in their respective queues.

Figure 11:
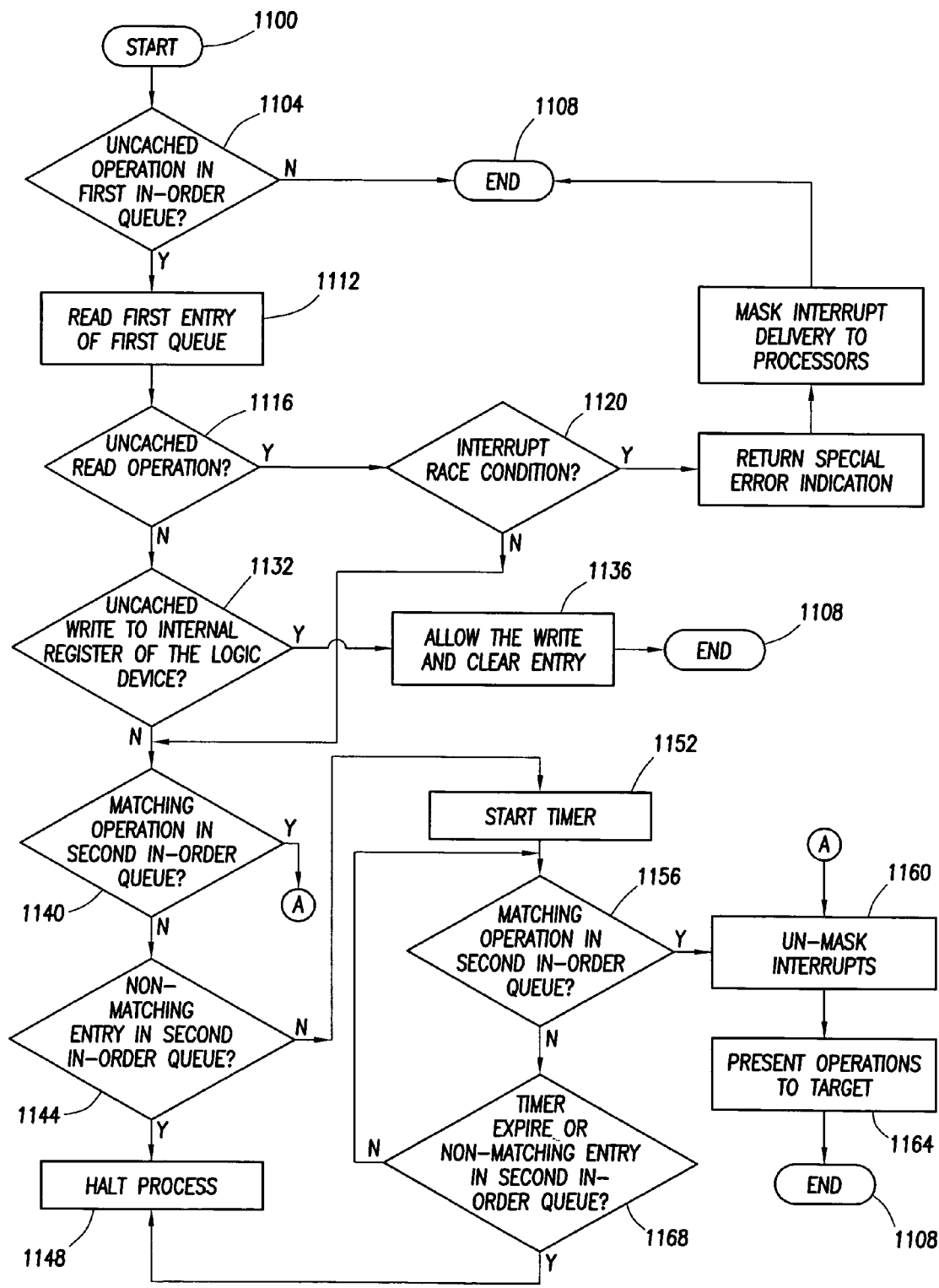
FIG. 11 illustrates a method of handling uncached operations in accordance with embodiments of the invention.

FIG. 11 is an illustrative flow diagram of a method, implemented by the logic device 36, to handle uncached operations. In particular, the process starts (block 1100) each time the logic device 36 is powered-on. The logic device then checks for an uncached operation in either of the in-order queues (block 1104). If no uncached operations are present, the illustrative method ends (block 1108) to be immediately started again, this time first analyzing the other in-order queue. If there is an uncached operation in the queue (block 1104) then the illustrative method reads the first entry in the first in-order queue (block 1112), and a determination is made as to whether the entry is an uncached read (block 116). If there is an uncached read, a determination is made as to whether there is a possible interrupt race (block 1120). In particular, because embodiments of the invention allow the processors to operate in other than cycle-by-cycle lock step, it is possible that an interrupt is asserted to one processor, yet the second processor internally masks interrupts before the assertion. Thus, one processor writes its program counter and graduated instruction counter, and then sends an uncached read directed to the compare register (see FIGS. 4A-4C), while the second processor presents some other form of uncached operation. Determining whether an interrupt race is present (block 1124) is therefore a determination of whether one processor performs steps associated with receipt of an interrupt, and the other performs a non-interrupt driven uncached operation, or no operation at all. If an interrupt race is present, the logic device 36 returns a special error indication from the read compare register (block 1124) informing the processor of the condition, assertion of interrupts to the processors from the logic device are masked (block 1128), and the process ends (block 1108). Thus, the processor that received the interrupt is allowed to continue processing, hopefully to reach the same C-point as the second processor. If no interrupt race is present (block 1120), processing continues by looking for matching operations (block 1140). The operations with respect to uncached reads and uncached writes are substantially the same, and so before discussing those similar situations, one case where uncached writes are handled differently is discussed.

If the operation found in the first entry of the in-order queue is not an uncached read (block 1116), a determination is made as to whether the queue entry is an uncached write to an internal register of the logic device (block 1132). Many uncached operations directed to internal registers will not be exactly the same, e.g., writing the program counter and graduated instruction counter to the compare registers. For this reason, uncached writes to internal registers are not required to have a matching uncached write in the second in-order queue. For this reason, uncached writes, when they reach the first location in their respective in-order queue, are allowed to complete without further checking (block 1136).

Still referring to FIG. 11, if the first entry in the in-order queue is not an uncached read caused by an interrupt race (blocks 1116 and 1120) or an uncached write to an internal register of the logic device (block 1132), then the uncached operation is of the type that should be matched prior to being allowed to complete. Thus, the next step is a determination of whether there is a matching operation in the first position of the second in-order queue (block 1140). If there is a matching operation in the second in-order queue, assertion of interrupts by the logic device 36 are unmasked (if interrupts were previously masked because of an interrupt race) (block 1160), the uncached operations are presented to their target (block 1164) (such as internal registers of the logic device 36, an I/O adapter, and/or main memory), and thereafter the process ends (block 1108), to be immediately restarted.

If there is no matching operation, two conditions could exist: either there is a non-matching uncached operation; or there is no entry. If there is a non-matching uncached operation in the first entry of the second in-order queue (block 1144), this evidences significant divergence of the pipelines of the processors, and thus each processor is halted (block 1148). If there is no operation in the first entry of the second in-order queue, a timer is started (block 1152), and the logic device 36 implementing the illustrative method of FIG. 11 waits for either the arrival of a matching operation in the second in-order queue (block 1156), or for the timer to expire or for the arrival of a non-matching entry (block 1168). If a matching entry arrives before the timer expires, assertion of interrupt by the logic device 36 is unmasked (if interrupts were previously masked because of an interrupt race) (block 1160), and the uncached operations are presented to their target (block 1164). If by expiration of the timer a matching operation is not presented, or a non-matching operation is presented (block 1168), this evidences significant divergence of the pipelines of the processors, and thus each processor is halted (block 1148).

Summarizing uncached operations, uncached writes to registers internal to the logic device 36 may not be the same, and thus uncached writes to the internal registers need not be matched, in time, number or in content, to be completed. When one processor sends an uncached read to the compare register, while the second processor sends an uncached operation other than a read to the compare register, this is indicative that one processor received an interrupt the second processor did not. In this case, the interrupted processor is returned an indication of the interrupt race, and allowed to continue processing. Beyond these special circumstances, uncached operations must be presented in the same order, but not necessarily at the same time. If matching uncached operations arrive within a timer period, they are allowed to complete. If no matching operation arrives in the second queue, or if a non-matching operation is presented, the processors are halted.

The above discussion is meant to be illustrative of the principles and various embodiments of the present invention. Numerous variations and modifications will become apparent to those skilled in the art once the above disclosure is fully appreciated. For example, FIG. 1 shows an independent logic device 36 and voter logic 28; however, in alternative embodiments the functionality of the logic device 36 and voter logic 28 could be combined into a single logic device 29, as illustrated in FIG. 1. It is intended that the following claims be interpreted to embrace all such variations and modifications.

What is claimed is:

1. A computer system comprising:
a first processor having a processor bus, the first processor configured to execute a program;
a second processor having a processor bus, the second processor configured to execute a duplicate copy of the program in lock step with the first processor; and
a logic device coupled to the processor bus of the first processor, and the processor bus of the second processor, the logic device configured to receive read operations from the first and second processors over the respective processor buses;
wherein the logic device is configured to present an interrupt request to the processors when the processors are at substantially the same computational point in the program;
wherein the logic device further comprises:
a first buffer associated with the first processor; and
a second buffer associated with the second processor;
wherein the logic device presents the interrupt request to the processors when there are matched cached reads in the first and second buffers; and
wherein the logic device is configured to request re-presentation (NACK) of the matched cached reads, and then present the interrupt request to the processors when the matched cached reads are found again in the first and second buffers within a predetermined period of time.

2. The computer system as defined in claim 1 wherein the logic device is configured to deliver the interrupt request to each processor as a prefix to presentation of read data of the matched cached reads.

3. A method comprising:
executing a program on a first processor;
executing a duplicate copy of the program on a second processor in lock step with the first processor;
receiving, by a logic device coupled to the processors, an interrupt request directed to the processors;
receiving, by the logic device, a cached read operation from each of the processors; and
sending, by the logic device, the interrupt request to the processors when each processor presents a matching cached read operation, the sending comprising:
   sending a request to re-present (NACK) to each processor regarding the matching cached read operations; and
   sending the interrupt request to the processors if the processors re-present the matching cached read operations within a predetermined period of time.

4. A method comprising:
executing a program on a first processor;
executing a duplicate copy of the program on a second processor in lock step with the first processor;
receiving, by a logic device coupled to the processors, an interrupt request directed to the processors;
receiving, from each processor, a matching cached read operation;
writing an address of the matching cached reads in a stall table;
sending a request to re-present (NACK) to each processor regarding the matching cached reads;
clearing the address of the matching cached reads from the stall table after a predetermined period of time; and
sending, by the logic device, the interrupt request to the processors after the processors re-present the matching cached reads if the address of the matching cached reads is in the stall table.

5. A logic device comprising:
a first bus configured to couple to a first processor that executes a program;
a second bus configured to couple to a second processor that executes a duplicate copy of the program in lock step with the first processor; and
a stall table within the logic device;
wherein the logic device is configured to accept an externally generated interrupt request directed to the processors or to internally generate an interrupt request directed to the processors;
wherein the logic device is configured to receive a matching cached read from each processor, send a request to re-present (NACK) to each processor regarding the matching cached reads, write an address of the matching cached reads in the stall table, and clear the address from the stall table after a predetermined period of time; and
wherein the logic device is configured to store the interrupt request, and to forward the interrupt request to each processor after the processors present again the matching cached reads if the address of the matching cached read is in the stall table.

6. A computer system comprising:
a first means for processing software instructions, the first means for processing configured to execute a program;
a second means for processing software instructions, the second means for processing configured to execute a duplicate copy of the program in lock step with the first means for processing;
a means for presenting an interrupt request to the first and second means for processing when the means for processing are substantially at the same computational point in the program, the means for presenting comprising:
   a first buffer means associated with the first means for processing; and
   a second buffer means associated with the second means for processing;
   wherein, when matched cached reads are in the first and second buffers means, the means for processing is configured to request re-presentation (NACK) of the matched cached reads, and then present the interrupt request to the means for processing if the matched cached reads are found again in the first and second buffer means in a predetermined period of time.

* * * * *

UNITED STATES PATENT AND TRADEMARK OFFICE
CERTIFICATE OF CORRECTION

PATENT NO. : 8,103,861 B2  Page 1 of 1
APPLICATION NO. : 11/346736
DATED : January 24, 2012
INVENTOR(S) : James S. Klecka et al.

It is certified that error appears in the above-identified patent and that said Letters Patent is hereby corrected as shown below:

In column 24, line 19, in Claim 5, delete "read" and insert -- reads --, therefor.

Signed and Sealed this
Twelfth Day of February, 2013

Teresa Stanek Rea
*Acting Director of the United States Patent and Trademark Office*